United States Patent

Suzuki et al.

Patent Number: 5,449,419
Date of Patent: Sep. 12, 1995

[54] FE BASED SOFT MAGNETIC ALLOY, MAGNETIC MATERIALS CONTAINING SAME, AND MAGNETIC APPARATUS USING THE MAGNETIC MATERIALS

[75] Inventors: Kiyonori Suzuki, Sendai; Akihiro Makino, Nagaoka; Tsuyoshi Masumoto, 8-22 3 chome, Uesugi, Aoba-ku, Sendai-shi, Miyagi-ken; Akihisa Inoue; Noriyuki Kataoka, both of Sendai, all of Japan

[73] Assignees: Alps Electric Co., Ltd., Tokyo; Tsuyoshi Masumoto, Sendai, both of Japan

[21] Appl. No.: 201,135

[22] Filed: Feb. 24, 1994

Related U.S. Application Data

[63] Continuation of Ser. No. 690,201, Apr. 23, 1991, abandoned.

[30] Foreign Application Priority Data

| Apr. 24, 1990 | [JP] | Japan | 2-108308 |
| Aug. 31, 1990 | [JP] | Japan | 2-230135 |
| Sep. 7, 1990 | [JP] | Japan | 2-237752 |
| Sep. 7, 1990 | [JP] | Japan | 2-237753 |
| Sep. 7, 1990 | [JP] | Japan | 2-237754 |
| Sep. 7, 1990 | [JP] | Japan | 2-237755 |
| Sep. 7, 1990 | [JP] | Japan | 2-237757 |
| Sep. 7, 1990 | [JP] | Japan | 2-237758 |
| Sep. 13, 1990 | [JP] | Japan | 2-243589 |
| Sep. 13, 1990 | [JP] | Japan | 2-243590 |
| Nov. 27, 1990 | [JP] | Japan | 2-324518 |
| Nov. 27, 1990 | [JP] | Japan | 2-324519 |

[51] Int. Cl.$^6$ .................................. H01F 1/147
[52] U.S. Cl. .............................. 148/306; 148/310; 148/311; 148/305; 420/121; 420/125; 75/244
[58] Field of Search ............ 148/305, 306, 310, 311; 420/121, 125; 75/244

[56] References Cited

U.S. PATENT DOCUMENTS

| 4,257,830 | 3/1981 | Tsuya et al. | 148/112 |
| 4,718,475 | 2/1988 | Das et al. | 164/415 |
| 4,735,865 | 4/1988 | Nago et al. | 428/610 |
| 4,750,951 | 6/1988 | Makino et al. | 148/304 |
| 4,918,555 | 4/1990 | Yoshizawa et al. | 360/125 |
| 4,985,089 | 1/1991 | Yoshizawa et al. | 148/311 |
| 5,028,280 | 7/1991 | Ihara et al. | 148/310 |
| 5,069,731 | 12/1991 | Yoshizawa et al. | 148/306 |
| 5,144,999 | 9/1992 | Makino et al. | 164/423 |
| 5,148,855 | 9/1992 | Ashok | 164/479 |

FOREIGN PATENT DOCUMENTS

| 242063 | 9/1960 | Australia . | |
| 0271657 | 6/1988 | European Pat. Off. | 148/305 |
| WO84/03852 | 10/1984 | WIPO . | |
| WO87/00462 | 1/1987 | WIPO . | |

*Primary Examiner*—John Sheehan
*Attorney, Agent, or Firm*—Guy W. Shoup; Patrick T. Bever

[57] ABSTRACT

An Fe-based soft magnetic alloy having a high saturated magnetic flux density and having a composition represented by formula (I) below:

$$(Fe_{1-a}Q_a)_b B_x T_y T'_z \qquad (I)$$

wherein Q represents at least one element selected from the group consisting of Co and Ni; T represents at least one element selected from the group consisting of Ti, Zr, Hf, V, Nb, Ta, Mo and W, with Zr and/or Hf being always included; T' represents at least one element selected from the group consisting of Cu, Ag, Au, Ni, Pd and Pt; a, b, x, y and z are real numbers satisfying relationships below:
$0 \leq a \leq 0.05$ atomic %,
$0 < b \leq 93$ atomic %,
$0.5 \leq x \leq 16$ atomic %,
$4 \leq y \leq 10$ atomic %,
$0 \leq z \leq 4.5$ atomic %
provided that when $0 < z \leq 4.5$ atomic %, Q represents Co and $0 < b \leq 92$ atomic %; and when $z=0$, $0.5 \leq x \leq 8$ atomic % and $4 \leq y \leq 9$ atomic %. Also disclosed are soft magnetic materials such as thin films, ribbons, and powder magnetic transducers such as low frequency transformers and magnetic heads using the material. Finally, processes and apparatuses for producing ribbons formed from the alloy are disclosed.

4 Claims, 19 Drawing Sheets

1000 Å

FE BASED SOFT MAGNETIC ALLOY, MAGNETIC MATERIALS CONTAINING SAME, AND MAGNETIC APPARATUS USING THE MAGNETIC MATERIALS

This application is a continuation of application Ser. No. 07/690,201, filed Apr. 23, 1991 now abandoned.

BACKGROUND OF THE INVENTION

1. Field of the Invention

The present invention relates to an Fe based soft magnetic alloy. Further, the present invention relates to magnetic materials containing such a soft magnetic alloy, for example, ribbons, compressed powders and the like as well as to a process and apparatus for producing such magnetic materials. Also, the present invention relates to magnetic transducers such as a magnetic head, a transformer and a choke coil. However, the present invention is also useful in other applications.

2. Description of Related Arts

Soft magnetic alloys used in magnetic heads, transformers. choke coils and the like must generally have the following characteristics:

(1) They have a high saturated magnetic flux density.
(2) They have a high permeability.
(3) They have a low coercive force.
(4) They can be shaped into a thin material.

On the other hand, magnetic heads must have the following characteristics in addition to (1) to (4) above from a point of view of abrasion resistance:

(5) They have a high hardness.

Accordingly, when producing soft magnetic alloys or magnetic heads, extensive investigations on the physical properties of various alloy compositions have been made taking into consideration the above-described points.

Heretofore, for the aforementioned purposes, there have been used crystalline alloys such as Sendust, Permalloy (50% Ni—Fe Permalloy, 80% Ni—Fe Permalloy, etc.), and silicon steel (see for example, Japanese Patent Publication Nos. 37688/1987 and 45285/1987). Recently, Fe-based or Co-based amorphous alloys have also been used.

In the case of magnetic heads, however, their has been a growing demand for magnetic materials suitable for high performance magnetic heads in order to cope with a recent trend toward magnetic recording media having a higher coercive force thereby keeping pace with a recent shift toward higher density recording. As for transformers and choke coils, high performance magnetic materials are desired because further miniaturization thereof is required to meet with miniaturization of various electronic devices.

However, the aforementioned Sendust has a defect in that its saturated magnetic flux density is as low as about 11 kG while it has an excellent soft magnetic characteristics. Similarly, Permalloy has a defect in that it has a low saturated magnetic flux density as low as about 8 kG when it has an alloy composition which exhibits excellent soft magnetic characteristics. More particularly, when it is applied to magnetic cores, core loss at high frequencies is large and the temperature of the core increases drastically at a frequency of no less than several tens kHz, resulting in that it is difficult to use as a material for magnetic cores. Silicon steel has a high saturated magnetic flux density but it has a poor soft magnetic characteristics. Also it is disadvantageous in that its iron loss is not low enough and thus it is unsatisfactory from a point of view of energy saving and has a problem with heat generation when used in transformers.

On the other hand, as for the amorphous alloy, Co-based amorphous magnetic cores have been increasingly used as cores for controlling switching power source, making the most of their features of having a low core loss at high frequencies and having a high squareness.

However, the Co-based amorphous alloys have problems in that not only they are costly because their constituent raw materials are expensive but also they have a low saturated magnetic flux density at a frequencies in zone of several tens kHz to 100 kHz and therefore they suffer from limited working magnetic flux density, thus making it difficult to sufficiently miniaturize magnetic cores.

Fe-Based alloys generally have a high saturated magnetic flux density and those having a saturated magnetic flux density of 15 kG or higher can be obtained but they have insufficient soft magnetic characteristics. It is known that Fe-based amorphous alloys give rise to magnetic cores having a high squareness ratio of a direct current B-H curve and a high maximum permeability can be obtained as described in Japanese Patent Publication No. 1183/1983.

However, magnetic cores made of the above-described Fe-based amorphous alloys have a large iron loss and efforts have been made to improve the iron loss by adjusting additive elements. However, in spite of these efforts, Fe-based amorphous alloys still have a large iron loss as compared with Co-based amorphous alloys. In addition, Fe-based amorphous alloys have an extremely large magnetic strain and are sensitive to stress. Therefore, they have a problem that their magnetic characteristics tend to deteriorate due to deformations as a result of mechanical vibration or by the weight of the alloys themselves.

Turning to an apparatus for producing magnetic materials, FIG. 1 shows a conventional apparatus for continuously producing a ribbon made of an amorphous alloy according to a so-called single roll method. The apparatus has a cooling roll 1 made of Cu which is rotated at a high speed and a nozzle 2 arranged in the vicinity of a top portion of the roll 1 which sprays a molten metal 3 onto the roll 1 thereby quickly cooling the molten metal 3 on the surface of the cooling roll 1 and solidifying it so that a ribbon can be formed, ribbon is drawn in a direction in which the cooling roll 1 rotates.

In the apparatus shown in FIG. 1, the surface of the cooling roll 1 is mirror surface-finished, the nozzle 2 is provided substantially vertically at a top portion of the cooling roll 1, with the distance between the tip of the nozzle and the surface of the cooling roll 1 being set to about 1 mm or less. The molten metal 3 discharged from the nozzle 2 forms a puddle 4 which is substantially stationary between the tip of the nozzle 2 and the surface of the cooling roll 1. As the cooling roll 1 rotates, the molten metal 3 is drawn out from the puddle 4 and cooled on the surface of the cooling roll 1 to be solidified in the form of a belt or ribbon, thus continuously forming a ribbon 5.

In this case, soft magnetic alloys generally used as a material for making magnetic heads are required to have a sufficiently smooth surface, that is, their surface roughness must be sufficiently small. However, ribbons produced by the conventional apparatus fail to always have a surface roughness small enough to be useful for acoustic magnetic heads and accordingly it has been strenuously demanded to develop an apparatus for producing an alloy ribbon which can give rise to smooth surfaces.

A further problem of the conventional apparatus is that ribbons produced thereby have a surface roughnesses which fluctuates between both surfaces. More specifically, in comparison with the roll contacting surface, which is formed while the molten metal is being solidified in contact with the cooling roll, the free solidification surface, which is formed by solidification of the molten metal without contact with the roll, has a relatively large surface roughness. Because of this defect, it is difficult to use the ribbons as a material for making magnetic heads.

Furthermore, in the case where ribbons are produced from a soft magnetic alloy mainly composed of Fe, there is a fear that the ribbons tend to be oxidized after quenching. Accordingly, there has also been a demand to produce Fe-based soft magnetic alloy ribbons without being oxidized.

SUMMARY OF THE INVENTION

The present invention is intended to provide Fe-based soft magnetic alloys free of the above-described problems, magnetic materials containing such alloys, a process and apparatus for producing the magnetic materials, as well as magnetic transducers using the magnetic materials.

An object of the present invention is to provide a soft magnetic alloy having a high saturated magnetic flux density and a high permeability and at the same time having a high mechanical strength and a high thermal stability.

Another object of the present invention is to provide a process for heat treatment of an Fe-based soft magnetic alloy in order to improve the magnetic characteristics thereof.

Still another object of the present invention is to provide a soft magnetic thin film having a high saturated magnetic flux density and a high permeability and at the same time having a high mechanical strength and a high thermal stability.

Yet another object of the present invention is to provide a process and apparatus for producing an Fe-based soft magnetic alloy ribbon having a high saturated magnetic flux density and a high permeability and at the same time having a high mechanical strength and a high thermal stability and also with improved physical-chemical properties such as surface roughness or extent of oxidation.

Further, an object of the present invention is to provide magnetic transducers, such as a magnetic cores, a magnetic heads or a low frequency transformer, to which are applied an Fe-based soft magnetic alloy having a high saturated magnetic flux density and a high permeability and at the same time having a high mechanical strength and a high thermal stability as well as showing a small iron loss.

According to the first aspect of the present invention, there is provided an Fe-based soft magnetic alloy having a high saturated magnetic flux density and having a composition represented by formula (I) below:

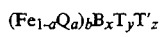  (I)

wherein Q represents at least one element selected from the group consisting of Co and Ni; T represents at least one element selected from the group consisting of Ti, Zr, Hf, V, Nb, Ta, Mo and W, with Zr and/or Hf being always included; T' represents at least one element selected from the group consisting of Cu, Ag, Au, Ni, Pd and Pt; a, b, x, y and z are real numbers satisfying relationships below:

$0 \leq a \leq 0.05$ atomic %,
$0 < b \leq 93$ atomic %,
$0.5 \leq x \leq 16$ atomic %,
$4 \leq y \leq 10$ atomic %,
$0 \leq z \leq 4.5$ atomic % provided that when $0 < z \leq 4.5$ atomic %, Q represents Co and $0 < b \leq 92$ atomic %; and when $z = 0$, $0.5 \leq x \leq 8$ atomic % and $4 \leq y \leq 9$ atomic %.

According to the second aspect of the present invention, there is provided a process for heat treating a high magnetic flux density alloy, comprising the steps of:

heating an Fe-based soft magnetic alloy having a high saturated magnetic flux density and having a composition represented by formula (I) as defined above at a temperature no lower than a crystallization temperature, and cooling the alloy at a cooling rate of no lower than 100° C./minute.

According to the third aspect of the present invention, there is provided a soft magnetic thin film composed of an Fe-based soft magnetic alloy having a high saturated magnetic flux density and having a composition represented by formula (I) as defined above.

According to the fourth aspect of the present invention, there is provided an Fe-based soft magnetic powder compact, comprising powder of an Fe-based soft magnetic alloy having a high saturated magnetic flux density and having a composition represented by formula (I) as defined above, the powder being compressed.

According to the fifth aspect of the present invention, there is provided a process for preparing an Fe-based soft magnetic alloy powder having a high saturated magnetic flux density, comprising the steps of:

heating an Fe-based soft magnetic alloy having a high saturated magnetic flux density and having a composition represented by formula (I) as defined above at a temperature no lower than a crystallization temperature to render it brittle, and pulverizing the alloy.

According to the sixth aspect of the present invention, there is provided an apparatus for producing an Fe-based soft magnetic alloy ribbon, having a cooling roll for cooling a molten metal of an Fe-based soft magnetic alloy, the cooling roll being rotatable and a nozzle having a tip, the nozzle being associated with the cooling roll with the tip thereof being arranged in the vicinity of a surface of the cooling roll at a predetermined distance therefrom and being adapted to spray the molten metal onto the surface of the cooling roll while the cooling roll is rotated in a predetermined direction so that the molten metal on the surface of the cooling roll can be molded in the form of a ribbon while it is being cooled and withdrawn in the direction in which the cooling roll is rotated, wherein the cooling roll has an outer peripheral surface portion and an inner portion, at least one of the outer peripheral surface portion and the inner portion being made of an Fe-based alloy, and wherein the nozzle is arranged in a slanted state with its axis being slanted at a predetermined angle with respect to an imaginary vertical axis.

According to the seventh aspect of the present invention, there is provided an apparatus for producing an Fe-based soft magnetic alloy ribbon, having a cooling roll for cooling a molten metal of an Fe-based soft magnetic alloy ribbon, the cooling roll being rotatable and a nozzle having a tip, the nozzle being associated with the cooling roll with the tip thereof being arranged in the vicinity of a surface of the cooling roll at a predetermined distance therefrom and being adapted to spray the molten metal onto the surface of the cooling roll while the cooling roll is rotated in a predetermined direction so that the molten metal on the surface of the cooling roll can be molded in the form of a ribbon while it is being cooled and withdrawn in the direction in which the cooling roll is rotated, wherein the cooling roll has an outer peripheral surface portion and an inner portion, at least one of the outer peripheral portion and the inner portion being made of an Fe-based alloy, and wherein the outer peripheral surface portion has a surface roughness corresponding to that obtainable by polishing with a polishing paper having a grain number of 100 to 1,000.

According to the eighth aspect of the present invention, there is provided a process for producing an Fe-based soft magnetic alloy ribbon by providing a molten metal of an Fe-based soft magnetic alloy, ejecting the alloy through a nozzle onto a surface of a cooling roll being rotated in a predetermined direction, the nozzle being associated with the cooling roll with a tip of the nozzle being arranged in the vicinity of the surface of the cooling roll at a predetermined distance therefrom, and withdrawing the ribbon in the same direction as that in which the cooling roll is rotated, wherein the cooling roll has an outer peripheral portion and an inner portion, at least one of the outer peripheral portion and the inner portion being made of an Fe-based alloy, and wherein the nozzle is arranged in a slanted state with its axis being slanted at a predetermined angle with respect to an imaginary vertical axis in the same direction as the direction in which the cooling roll is rotated so that the molten metal from the tip of the nozzle can be ejected onto the surface of the cooling roll which is coming up to the tip of the nozzle.

According to the ninth aspect of the present invention, there is provided a process for producing an Fe-based soft magnetic alloy ribbon by providing a molten metal of an Fe-based soft magnetic alloy, ejecting the alloy through a nozzle onto a surface of a cooling roll being rotated in a predetermined direction, the nozzle being associated with the cooling roll with a tip of the nozzle being arranged in the vicinity of the surface of the cooling roll at a predetermined distance therefrom, and withdrawing the ribbon in the same direction as that in which the cooling roll is rotated, wherein the cooling roll has an outer peripheral portion and an inner portion, at least one of the outer peripheral portion and the inner portion being made of an Fe-based alloy, and wherein the outer peripheral surface portion has a surface roughness corresponding to that obtainable by polishing with a polishing paper having a grain number of 100 to 1,000.

According to the tenth aspect of the present invention, there is provided a process for producing an Fe-based soft magnetic alloy ribbon, comprising the steps of:

providing a molten metal of an Fe-based soft magnetic alloy having a composition represented by formula (I) as defined above, providing an evacuatable chamber, housing a nozzle for ejecting the molten metal and a cooling roll in the evacuatable chamber, establishing vacuum in the evacuatable chamber, ejecting the alloy through the nozzle onto a surface of the cooling roll while the roll is being rotated in a predetermined direction, the nozzle being associated with the cooling roll with a tip of the nozzle being arranged in the vicinity of the surface of the cooling roll at a predetermined distance therefrom, to form a ribbon of the alloy, and withdrawing the ribbon in the same direction as that in which the cooling roll is rotated.

According to the eleventh aspect of the present invention, there is provided a magnetic core made of an Fe-based soft magnetic alloy, wherein said Fe-based soft magnetic alloy is composed of a high saturated magnetic flux density Fe-based soft magnetic alloy having a composition represented by formula (I) as defined above.

According to the twelfth aspect of the present invention, there is provided a low frequency transformer having an Fe-based soft magnetic alloy and a conductor wire, wherein said Fe-based soft magnetic alloy is composed of a high saturated magnetic flux density Fe-based soft magnetic alloy having a composition represented by formula (I) as defined above.

According to the thirteenth aspect of the present invention, there is provided a magnetic head having a core made of an Fe-based soft magnetic alloy, wherein said Fe-based soft magnetic alloy is composed of a high saturated magnetic flux density Fe-based soft magnetic alloy having a composition represented by formula (I) as defined above.

According to the present invention, there can be provided an Fe-based soft magnetic alloy not only having soft magnetic characteristics equal to or superior to the conventional alloys put into practical use but also having a higher saturated magnetic flux density. In addition, the soft magnetic alloy of the invention has a high mechanical strength and a high thermal stability simultaneously.

From this it follows that the Fe-based soft magnetic alloy of the present invention is suitable for magnetic transducers such as transformers and choke coils of which further reduction in size is demanded, and when it is used in these applications i can effectively increase performance of the magnetic transducers and reduce their size and weight.

Further, according to the present invention, ribbons made of Fe-based soft magnetic alloys can be produced continuously in a state in which their physical chemical properties such as surface roughness or extent of oxidation are improved.

Other objects, constructions and effects of the present invention will be obvious to one skilled in the art from the following detailed explanation with reference to accompanying drawings.

BRIEF DESCRIPTION OF THE ACCOMPANYING DRAWINGS

DESCRIPTION OF PREFERRED EMBODIMENTS

Figure 1:
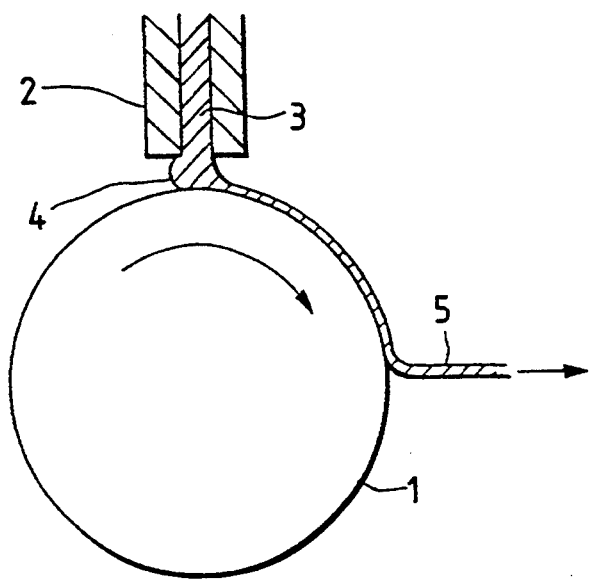
FIG. 1 is a schematic cross-sectional view of a conventional apparatus for producing an amorphous alloy ribbon.

The Fe-based soft magnetic alloy represented by formula (I) according to the present invention includes the following species.

(i) When $z \neq 0$ (or $0 < z \leq 4.5$), the composition of the Fe-based soft magnetic alloy of the invention can be represented by formula (Ia) below:

$$(Fe_{1-a}Co_a)_b B_x T_y T'_z \qquad (Ia)$$

wherein T represents at least one element selected from the group consisting of Ti, Zr, Hf, V, Nb, Ta, Mo and W, with Zr and/or Hf being always included; T' represents at least one element selected from the group consisting of Cu, Ag, Au, Ni, Pd and Pt; a, b, x, y and z are real numbers satisfying relationships below:

$0 \leq a \leq 0.05$ atomic %,
$0 < b \leq 92$ atomic %,
$0.5 \leq x \leq 16$ atomic %,
$4 \leq y \leq 10$ atomic %,
$0 < z \leq 4.5$ atomic %

(ii) When $z \neq 0$ (or $0 < z \leq 4.5$) and $a = 0$, the composition of the Fe-based soft magnetic alloy of the invention can be represented by formula (Ib) below:

$$Fe_b B_x T_y T'_z \qquad (Ib)$$

wherein T represents at least one element selected from the group consisting of Ti, Zr, Hf, V, Nb, Ta, Mo and W, with Zr and/or Hf being always included; T' represents at least one element selected from the group consisting of Cu, Ag, Au, Ni, Pd and Pt; b, x, y and z are real numbers satisfying relationships below:

$0 < b \leq 92$ atomic %,
$0.5 \leq x \leq 16$ atomic %,
$4 \leq y \leq 10$ atomic %,
$0 < z \leq 4.5$ atomic %

(iii) When $z = 0$ and $a \neq 0$ (or $0 < a\ 0.05$), the composition of the Fe-based soft magnetic alloy of the invention can be represented by formula (Ic) below:

$$(Fe_{1-a}Q_a)_b B_x T_y \qquad (Ic)$$

wherein Q represents at least one element selected from the group consisting of Co and Ni; T represents at least one element selected from the group consisting of Ti, Zr, Hf, V, Nb, Ta, Mo and W, with Zr and/or Hf being always included; a, b, x and y are real numbers satisfying relationships below:

$0 < a \leq 0.05$ atomic %,
$0 < b \leq 93$ atomic %,
$0.5 \leq x \leq 8$ atomic %, and
$4 \leq y \leq 9$ atomic %, (iv) When $z = 0$ and $a = 0$, the composition of the Fe-based soft magnetic alloy of the invention can be represented by formula (Id) below:

$$(Fe_b B_x T_y \qquad (Id)$$

wherein T represents at least one element selected from the group consisting of Ti, Zr, Hf, V, Nb, Ta, Mo and W, with Zr and/or Hf being always included; b, x and y are real numbers satisfying relationships below:

$0 < b \leq 93$ atomic %,
$0.5 \leq x \leq 8$ atomic %, and
$4 \leq y \leq 9$ atomic %, The high saturated magnetic flux density Fe-based soft magnetic alloy of the present invention can usually be prepared by a method including the steps of preparing, by quenching of a molten metal or by a gas phase quenching, an amorphous alloy having the above-described composition (composition (I), composition (Ia), (Ib), (Ic) or (Id)) or a crystalline alloy containing such an amorphous alloy phase, and by heat treating the resulting alloy to form fine crystal grains In the present invention, in order to make it easy to obtain an amorphous phase, the alloy must contain either one of Zr and Hf which have a high amorphous phase forming capability. A portion of Zr or Hf may be replaced by one or more of Ti, V, Nb, Ta, Mo and W selected from among elements belonging to the group 4A to 6A of the periodic table. These elements are sometimes referred to herein as the first additive elements. The reason why Cr is not included in the first additive elements is that Cr has a poorer capability of forming an amorphous phase than the other elements recited above. However, once a suitable amount of Zr and/or Hf is present in the alloy, Cr may be added too.

Presumably, B (boron) has an effect of increasing the capability of the alloy of the present invention to form an amorphous phase and an effect of inhibiting formation of a phase of a compound which affects adversely on the magnetic characteristics in the above-described heat treatment step. For this reason, addition of B is essential. Other elements such as Al, Si, C and P are commonly used together with B as an amorphous phase forming element. The alloy of the present invention may contain such amorphous phase forming elements.

In the present invention, when the content of B and one or more of the first additive elements is relative high (i.e, x is more than 8 atomic %; and y is more than 9 atomic %), the alloy must contain at least one element selected from among Cu, Ni and those elements which are in the same family as Cu and Ni as the second additive element in an amount of 4.5 atomic % or less, preferably no less than 0.2 atomic % and no more than 4.5 atomic %. If the content of the second additive element or elements is less than 0.2 atomic %, excellent soft magnetic characteristics cannot be obtained during the above-described heat treatment. However, this is not a fatal defect because in this case, desirable soft magnetic characteristics can be obtained by increasing the cooling rate to some extent. Among the second additive elements, particularly preferred is Cu.

While the mechanism of improvement of soft magnetic characteristics by addition of Cu, Ni or the like element is still unclear, it was confirmed as a result of measurement of crystallization temperature of the alloy according to differential thermal analysis method that the crystallization temperature of the alloy containing Cu, Ni or the like element is slightly lower than that of the alloy containing no such element. This would be ascribable to loss of homogeneity in the amorphous phase by the addition of the second additive element or elements, which results in decrease in the stability of the amorphous phase. It is also presumed that upon crystallization of non-uniform amorphous phase, there are formed a number of local regions where crystallization occurs readily to generate non-uniform nuclei, thus giving a fine crystal grain texture.

In the case of addition of Cu, whose content as a solid solution with Fe is very small, phase separation tends to occur and therefore microscopic fluctuation in the composition tends to occur, which increases markedly the tendency of rendering the amorphous phase more nonuniform. This would be considered to contribute making the texture finer.

In view of the above points, elements other than Cu and its family, and Ni, Pd and Pt which can decrease crystallization temperature of the alloy are naturally expected to exhibit a similar effect. A similar effect is also expected for those elements which have a low solid solution content with Fe as in the case of Cu.

The above explains the reason why the amounts of the elements contained in the Fe-based soft magnetic alloy of the present invention are limited to specified ranges. However, besides the aforementioned elements, elements belonging to the platinum family such as Cr and Ru may be added in order to improve corrosion resistance of the alloy. If desired, Y, rare earth elements, Zn, Cd, Ga, In, Ge, Sn, Pb, As, Sb, Bi, Se, Te, Li, Be, Mg, Ca, St, Ba and the like may also be added in order to adjust magnetic strain of the alloy. Inevitable impurities such as H, N, 0 and S may be present in the Fe-based soft magnetic alloy of the present invention in amounts such that desired characteristics of the alloy are not deteriorated. Needless to say, the alloy composition containing the inevitable impurities in such amounts may be deemed to be the same as or equivalent to the composition of the high saturated magnetic flux density Fe-based soft magnetic alloy of the invention.

As for the content of B in the alloy of the invention, it is within the range of $0.5 \leq x \leq 16$ atomic % in the case where the second additive element or elements are present or within the range of $0.5 \leq x \leq 8$ atomic % in the case where no second additive element is present that it becomes easy to obtain an effective permeability of 10,000 or higher.

As for the content of the first additive element or elements in the alloy of the invention, in the case where the second additive element or elements are contained in the alloy, the effective permeability of no lower than 10,000 is not obtained with less than 4 atomic % of the first additive element while with above 10 atomic % of the first additive element not only the permeability decreases drastically but also saturated magnetic flux density decreases considerably. Therefore, the content of the first additive element is limited within the range of $4 \leq y \leq 10$ atomic %. In the case where the second additive element is absent, the content of the first additive element or elements is similarly limited within the range of $4 \leq y \leq 9$ atomic %.

The content b of Fe+Co and/or Ni as main components of the alloy of the present invention is no more than 92 atomic % in the case where one or more of the second elements are present, or no more than 93 atomic % in the case where the second element is absent.

This is because a high permeability is not obtained if it exceeds 92 atomic % in the presence of the second additive element(s) or 93 atomic % in the absence of the second additive element. However, in order to obtain a saturated magnetic flux density of 10 kG or higher, it is preferred that b be no less than 75 atomic %.

In the above-described heat treatment, the soft magnetic alloy composition is heated at a temperature higher than its crystallization temperature, preferably at a temperature of 550° to 650° C., and subsequently cooled at a cooling rate of 100° C./minute or higher. The cooling rate of lower than 100° C./minute is undesirable because the resulting soft magnetic alloy has a decreased permeability.

The magnetic characteristics of the alloy of the present invention can be controlled by properly selecting optimal heat treatment conditions. Also, it is possible to improve the magnetic characteristics by annealing the alloy in a magnetic field.

The Fe-based soft magnetic alloy of the present invention, like the conventional amorphous alloys, can be obtained usually in the form of a ribbon by a quenching method, and the ribbon is used for producing a magnetic core for magnetic heads after punching and laminating it. However, it is sometimes the case that among magnetic heads and choke coils those having complicated shapes cannot be produced from ribbons of the amorphous alloy. In this case, powder of the amorphous alloy is prepared and compressed together with a binder to form a powder compact serving as a magnetic head or choke coil having a desired shape.

Because the alloy of the present invention has excellent magnetic characteristics even when it is in the form of a thin film, it is useful as a soft magnetic thin film which can be used as a core for magnetic heads.

(1) Thin Film

As for the method of forming a thin film of the Fe-based soft magnetic alloy of the invention described above, there can be used various methods utilizing an apparatus for forming a thin film such as a sputtering apparatus and a vapor deposition apparatus.

As for the sputtering apparatus, there can be used any known ones, for example, RF two-layer sputter, DC sputter, magnetron sputter, 3-electrode sputter, ion beam sputter, confronting target type sputter and the like.

Then, the thin film thus-prepared is subjected to heat treatment in which the film is heated to form fine crystal grains. This heat treatment step is the same as used for the above-described Fe-based soft magnetic alloy itself.

(2) Ribbon

As an apparatus for continuously producing ribbon of an amorphous alloy, there is known a single roll type apparatus as shown in FIG. 1. The apparatus shown in FIG. 1 operates as follows. That is, while the cooling roll 1 made of Cu is being rotated at a high speed, the molten metal 3 is ejected from the nozzle 2 arranged in the vicinity of the top of the roll. Thus, the molten metal 3 is quenched on the surface of the cooling roll 1 to be solidified and molded into a ribbon, which is then withdrawn in the same direction as the direction in which the cooling roll 1 rotates.

In the case of the apparatus shown in FIG. 1, the surface of the cooling roll 1 is mirror surface-finished and the nozzle 2 is provided substantially vertically at the top of the roll, with the distance between the tip of the nozzle and the surface of the cooling roll at the top thereof set to about 1 mm or less.

The molten metal 3 discharged from the nozzle 2 forms a puddle 4 which is substantially at a standstill and repose between the tip of the nozzle 2 and the surface of the cooling roll 1. As the cooling roll 1 rotates, the molten metal is withdrawn from the puddle 4 and cooled on the surface of the roll in the form of a ribbon 5, thus producing the ribbon 5 continuously.

While it is possible to use the conventional apparatus for continuously producing a ribbon as described described in the production of the Fe-based soft magnetic alloy ribbon of the present invention, it is desirable to further improve the apparatus when the product is intended to be used as a raw material for producing magnetic heads and the like in order to provide ribbons having a sufficiently small surface roughness, having uniform surface roughness values on both sides thereof, and the oxidation of which is prevented during its production.

Upon observation of ribbons produced by the conventional apparatus having a cooling roll whose surface is mirror surface-finished, there are observed wavy depressions and protrusions on freely solidified surfaces of the ribbons along their length. It is presumed that the unevenness is generated because of minute slipping which would occur on the roll while the ribbon is being withdrawn from the puddle. On the other hand, the same type of unevenness as in the freely solidified surface is observed to some extent on the roll contacting surface of the ribbon formed by solidification of the alloy occurring while it is in contact with the roll. But basically the unevenness in the surface of the cooling roll is transferred as it is to the roll contacting surface of the ribbon, resulting in that the roll contacting surface of the ribbon has a surface roughness smaller than that of the freely solidified surface.

Hence, in the apparatus for continuously producing a ribbon according to one embodiment of the present invention, the surface of the cooling roll is made rougher than the mirror surface-finished surface to increase friction between the ribbon and the surface of the roll greater than ever, thereby preventing slipping of the ribbon on the cooling roll and thus preventing the occurrence of unevenness in the freely solidified surface. This improves the surface roughness condition of the freely solidified surface. In addition, because the surface roughness of the cooling roll contacting surface depends on the surface roughness of the surface of the cooling roll, the surface roughness values of the both surfaces of the ribbon can be made substantially equal by optimally adjusting the surface roughness of the surface of the cooling roll. As a result, Fe-based soft magnetic ribbons suitable for magnetic heads and the like can be obtained.

Further, the use of a molten metal of the soft magnetic alloy having the specified composition gives rise to ribbons of Fe-based soft magnetic alloy which have a high saturated magnetic flux density and a high permeability as well as having a high hardness and an excellent thermal resistance and which are suitable for magnetic heads and the like.

Figure 2:
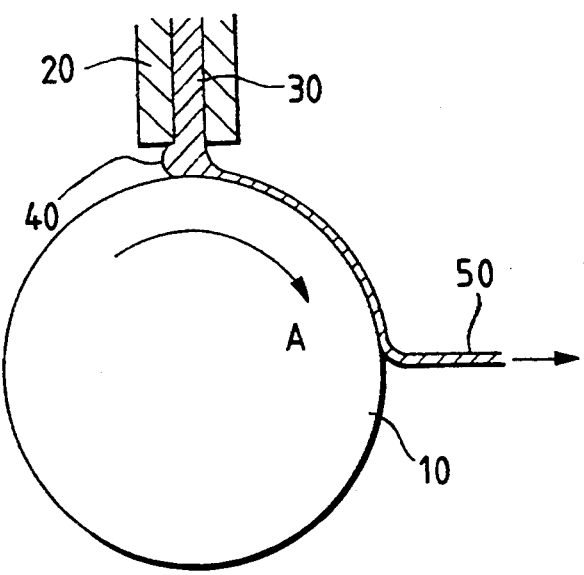
FIG. 2 is a schematic cross-sectional view of the apparatus for continuously producing an Fe-based soft magnetic alloy ribbon according to one embodiment of the present invention.

FIG. 2 shows the apparatus for continuously producing a ribbon according to the above-described embodiment of the present invention. The apparatus shown in FIG. 2 has substantially the same construction as the conventional apparatus shown in FIG. 1, and similarly operates. That is, a cooling roll 10 is rotated at a high speed, and while it is being rotated, a molten metal 30 is ejected onto the roll from a nozzle 20 arranged in the vicinity of the top of the cooling roll 10 to thereby quench and solidify the molten metal 30 to form a ribbon 50, which is then withdrawn in the same direction as the direction in which the cooling roll 10 is rotated.

The major difference between the apparatus according to the instant embodiment and the conventional apparatus is that the cooling roll 10 is made of an Fe-based alloy. That is, the cooling roll 10 is constructed using an Fe-based alloy such as stainless steel. It should be appreciated that only the outer peripheral surface portion of the cooling roll need be made of the Fe-based alloy.

The outer peripheral surface portion of the cooling roll 10 is finished to have a surface roughness larger than mirror surface-finished one by being polished with a polishing paper having a grain number 600 to 1,000, preferably 800. By so doing, the surface roughness values on the both sides of the ribbon 50 are made substantially uniform.

As described above, the surface roughness values of both sides of the ribbon can be made sufficiently small and uniform therebetween by making the surface of the cooling roll 10, or at least outer peripheral surface portion of the cooling roll 10, to have a surface roughness corresponding to that obtainable by polishing with a polishing paper having a grain number of 600 to 1,000, preferably 800. Therefore, the apparatus according to the instant embodiment of the present invention is suitable as an apparatus for continuously producing a soft magnetic alloy ribbon useful as a material for magnetic heads, particularly acoustic magnetic heads.

The molten metal 30 is a molten metal of the Fe-based soft magnetic alloy having a composition represented by formula (I) as defined above.

Next, production of an Fe-based soft magnetic alloy ribbon using the apparatus shown in FIG. 2 will be described hereafter.

When a molten metal of the alloy having the above-described composition is ejected from the nozzle 20 onto the top of the cooling roll 10 while the roll is being rotated, the molten metal of the alloy forms the puddle 40 on the top of the cooling roll 10 and extruded therefrom along the surface of the cooling roll to produce the ribbon 50. The ribbon 50 is mostly composed of an amorphous phase.

Here, the outer peripheral surface portion of the cooling roll 10 is made of an Fe-based alloy, which is excellent in its wettability with the Fe-based soft magnetic alloy, thus facilitating separation of the ribbon 50 from the cooling roll 10 so that the ribbon 50 obtained has a uniform thickness. On the contrary, it is undesirable to use the cooling roll 10 made of metal other than the Fe-based alloy, e.g., a roll made of Cu or the like, because in this case the molten metal is scattered when it is ejected from the nozzle 20 and fail to produce ribbons of a good shape.

Further, because the surface of the cooling roll 10 is formed to have a suitable roughness, the ribbon 50 is prevented from slipping on the cooling roll 10, resulting in that the ribbon 50 has a sufficiently small surface roughness on the both sides.

Annealing of the ribbon 50 thus obtained by heating at a temperature of 500° to 620° C. followed by gradual cooling leads to crystallization of non-uniform amorphous phase in the ribbon 50, and as result there are formed a number of regions where local crystallization is ready to occur, thus forming non-uniform nuclei. This makes the resulting texture finer, and consequently gives rise to a fine crystalline texture containing crystal grains of a size of about 100 to 200 Å. As a result, a Fe-based soft magnetic alloy ribbon having a high saturated magnetic flux density and a high permeability as well as exhibiting excellent soft magnetic characteristics and being very hard and excellent in thermal resistance can be obtained.

As explained above, the surface roughness values of both sides of the ribbon can be made sufficiently small and uniform therebetween by making the surface of the cooling roll 10, or at least outer peripheral surface portion of the cooling roll 10, to have a surface roughness corresponding to that obtainable by polishing with a polishing paper having a grain number of 600 to 1,000, preferably 800. Therefore, the apparatus according to the instant embodiment of the present invention is suitable as an apparatus for continuously producing a soft magnetic alloy ribbon useful as a material for magnetic heads, particularly acoustic magnetic heads.

In the apparatus according to another embodiment of the present invention, the tip of the nozzle is arranged so as to confront the surface of the roll in a slanted state such that the tip is directed toward the backward side with respect to direction of rotation of the cooling roll. As compared with the conventional apparatus in which the nozzle is arranged to confront the surface of the cooling roll vertically, the size or volume of the puddle formed between the tip of the nozzle and the cooling roll is larger than that formed in the conventional apparatus. By the rotation of the cooling roll the molten metal is withdrawn from the puddle to form a ribbon. On this occasion, the larger the volume of the puddle, smaller the substantial variation in volume, resulting in that the molten metal is withdrawn more stably than in the case where a small puddle is formed, which reduces fluctuation in the surface roughness of the resulting ribbon. As a result, an Fe-based soft magnetic ribbon suitable for magnetic heads can be obtained.

The use of a molten metal of the soft magnetic alloy having the specified composition gives rise to an Fe-based soft magnetic ribbon having a high saturated magnetic flux density and a high permeability as well as being very hard and excellent in thermal stability and thus is suitable for magnetic heads.

Figure 3:
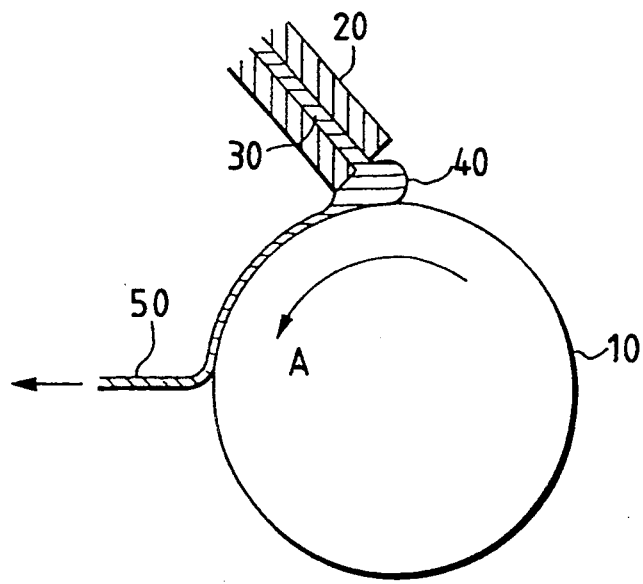
FIG. 3 is a schematic cross-sectional view of the apparatus for continuously producing an Fe-based soft magnetic alloy ribbon according to another embodiment of the present invention, illustrating the positional relationship between the cooling roll and the nozzle.
Figure 4:
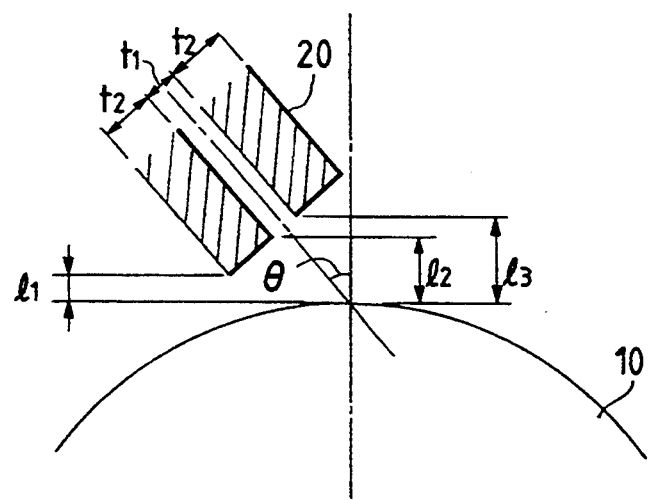
FIG. 4 is a schematic fragmentary cross-sectional view of the apparatus shown in FIG. 3, illustrating the angle of slanting of the nozzle.

FIGS. 3 and 4 shows the construction of the apparatus for producing a ribbon according to still another embodiment of the present invention. The apparatus according to the instant embodiment can be constructed with the same or similar members as used in the apparatus shown in FIG. 2 but is different from the apparatus shown in FIG. 2 in the direction of the nozzle and the direction of rotation of the cooling roll. Roughening of the cooling roll is not essential but it is preferred to carry out the toughening of the ribbon.

In the apparatus according to the instant embodiment, as shown in FIG. 3, the direction of rotation of the cooling roll 10 is contrary to that of the cooling roll in the apparatus shown in FIG. 2, and the resulting ribbon 50 is withdrawn to the left as indicated by an arrow in FIG. 3. Stated more strictly, in the apparatus shown in FIG. 2, the molten metal 30 is supplied vertically downward from the nozzle 20 arranged vertically so that the tip of the nozzle is directed in a direction passing the center in vertical cross section of the cooling roll 10 and therefore there is no difference regardless of the direction of rotation of the cooling roll 10. On the contrary, in the apparatus of the instant embodiment, the direction of rotation of the cooling roll is fixed for the direction of slanting of the nozzle (explained hereinbelow).

The nozzle 20 is arranged in the vicinity of the top of the cooling roll 10, with the tip of the nozzle being directed toward the backward side with respect to the direction of rotation of the cooling roll (the right hand side in FIG. 3) at a predetermined angle with respect to an imaginary vertical axis. The angle $\theta$ of slanting of the nozzle with respect to imaginary vertical axis (see FIG. 4) is set to a value within a range not exceeding 40°. The size of every part of the nozzle 20 and distance of the tip of the nozzle 20 from the cooling roll 10 may be properly set but preferably the size $t_1$ of the slit of the nozzle 20 is set to 0.5 mm, the size, or thickness, $t_2$ to 1.0 mm and the distance $l_1$ between the tangential line passing the uppermost part of the cooling roll and the lowermost end of the nozzle 20 to about 0.5 mm. Further, the distance $l_2$ between the lower part of the slit and the above-described tangential line is $l_2 = l_1 + t_2 \sin\theta$. On the other hand, the distance $l_3$ between the upper part of the slit and the above-described tangential line is $l_3 = l_1 + (t_2 + t_3) \sin\theta$; when $t_1 = 0.5$ mm, $t_2 = 1.0$ mm, and $l_1 = 0.5$ mm and $\theta = 40°$ C., then $l_2 =$ about 1.14 mm and $l_3 =$ about 1.46 mm The molten metal 30 sprayed on the cooling now 10 may be a molten metal of the Fe-based soft magnetic alloy having a composition represented by formula (I) as defined above.

Next, production of an Fe-based soft magnetic alloy ribbon using the apparatus shown in FIG. 3 will be described.

When a molten metal of the alloy having the above-described composition is ejected from the nozzle 20 onto the top of the cooling roll 10 while the roll is being rotated in the direction indicated by an arrow A in FIG. 3, the molten metal of the alloy forms the puddle 40 on the top of the cooling roll 10 and is extruded therefrom along the surface of the cooling roll to produce the ribbon 50. The ribbon 50 is mostly composed of an amorphous phase.

Here, the outer peripheral surface portion of the cooling roll 10 is made of an Fe-based alloy, which s excellent in its wettability with the Fe-based soft magnetic alloy, so that the ribbon 50 can be conveyed smoothly out of the cooling roll 10. On the contrary, it is undesirable to use the cooling roll 10 made of a metal other than the Fe-based alloy, e.g., a roll made of Cu or the like, because in this case the molten metal is scattered when it is ejected from the nozzle 20 and fails to produce ribbons of a good shape.

Because the puddle 40 formed on the cooling roll 10 is large enough in size or volume, the ribbon 50 is withdrawn from this large. Puddle stably. The larger the paddle 40, the less the variation in the size of the puddle 40, thus giving rise to the ribbon 50 having a uniform thickness.

Annealing of the ribbon 50 thus obtained by heating at a temperature of 500° to 620° C. followed by gradual cooling leads to crystallization of non-uniform amorphous phase in the ribbon 50, and as result there are formed a number of regions where local crystallization is ready to occur, thus forming non-uniform nuclei. This makes the resulting texture finer, and consequently gives rise to a fine crystalline texture containing crystal grains of a size of about 100 to 200 Å. As a result, a Fe-based soft magnetic alloy ribbon having a high saturated magnetic flux density and a high permeability as well as exhibiting excellent soft magnetic characteristics and being very hard and excellent in thermal resistance can be obtained.

Figure 5:
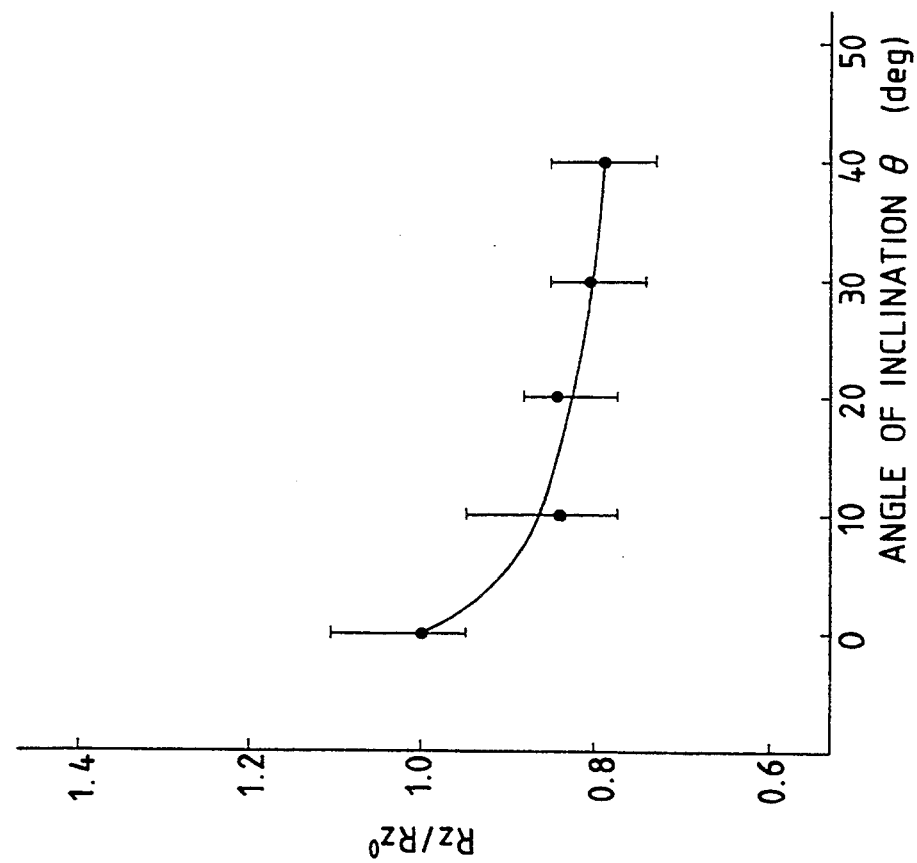
FIG. 5 is a graph showing the relationship between the angle of slanting of the nozzle in the apparatus shown in FIG. 3 and the surface roughness of the produced ribbon.

FIG. 5 is a graph plotting results of actual measurements showing the relationship between the angle $\theta$ of slanting of the nozzle 20 and surface roughness Rz of the cooling roll. The horizontal axis indicates the angle $\theta$ of slanting of the nozzle 20 while the vertical axis indicates ratio $Rz/Rz^0$ where $Rz^0$ is the surface roughness at an angle $\theta$ being 0° and Rz is the surface roughness with the slanted nozzle 20 being slanted at an angle $\theta$ being larger than 0°. As will be apparent from FIG. 5, the surface roughness Rz becomes smaller, that is, the surface of the resulting ribbon becomes smoother with an increase of the angle $\theta$ of slanting of the nozzle 20.

To note, the surface roughness values $Rz^0$ and $Rz$ are obtained by calculation from 10 point average roughness prescribed in JIS-B-0601 measured using a needle type surface roughness meter.

The reason why the surface roughness Rz reduced by slanting the nozzle 20 is presumably ascribable to increase of the size of the puddle 40 formed between the tip of the nozzle 20 and the cooling roll 10 when the nozzle is slanted as compared with the case where the nozzle 20 is not slanted, which reduces the substantially subtle variation in the volume of the puddle 40 as the molten metal 30 is withdrawn from the puddle 40, thus assuring that the molten metal is withdrawn stably from the puddle.

When the distance $l_1$, between the lowermost end of the nozzle 20 and the cooling roll 10 is set to a constant value, the puddle 40 grows larger according as the angle q of slanting of the nozzle 20 increases to a certain level. However, if the angle $\theta$ exceeds 40°, the molten metal 30 flows down on the backward side with respect to the direction of rotation of the cooling roll 10 due to the weight of itself, thus failing to form the puddle 40. Therefore, the angle $\theta$ should not exceed 40°.

On the other hand, when the nozzle is slanted such that the tip thereof is directed toward the forward side with respect to the direction of rotation of the cooling roll 10, the puddle 40 of a large size is not formed and therefore no improvement in the surface roughness of the resulting ribbon can be obtained.

Figure 6:
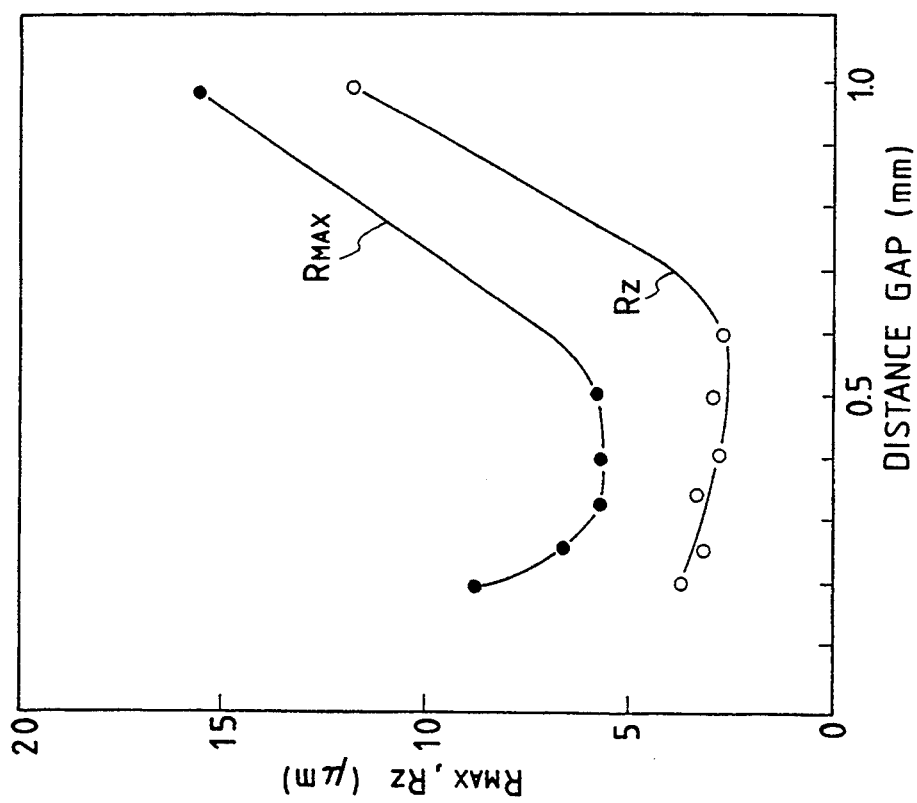
FIG. 6 is a graph showing the relationship between the distance of the nozzle from the surface of the cooling roll in the apparatus shown in FIG. 3 and the surface roughness of the produced ribbon.

FIG. 6 is a graph plotting results of examination on the influence of the distance between the tip of the nozzle 20 and the surface of the cooling roll 10 when the angle $\theta$ of slanting of the nozzle 20 is fixed. In FIG. 6, the horizontal axis indicates the gap or distance between the tip of the nozzle 20 and the surface of the cooling roll 10 (size $l_1$ described above) while the vertical axis indicates the surface roughness Rz and Rmax of the ribbon 50 formed. Rmax is maximum surface roughness measured using a needle type surface roughness meter. From the graph shown in FIG. 6, it can be seen that Rz and Rmax are the smallest when size $l_1$ is set to a value within the range of 0.3 to 0.5 mm. Accordingly, it is preferred to set the value of $l_1$ within that range. On this occasion, when the angle of slanting of the nozzle 20 is set to $\theta=40°$, other sizes are $l_2=0.94$ to 1.14 mm, and $l_3=$ about 1.26 to about 1.46 mm, resulting in that the distance between the slit in the nozzle 20 and the cooling roll 10 is substantially larger than the conventional case where it is set to usually about 1 mm or less.

In the process for continuously producing a ribbon according to one embodiment of the present invention, the nozzle and the cooling roll are housed in a chamber evacuated to vacuum and in this state the molten metal is sprayed onto the cooling roll to form a ribbon. Therefore, a ribbon of a non-oxidized alloy containing less impurities is produced.

Figure 7:
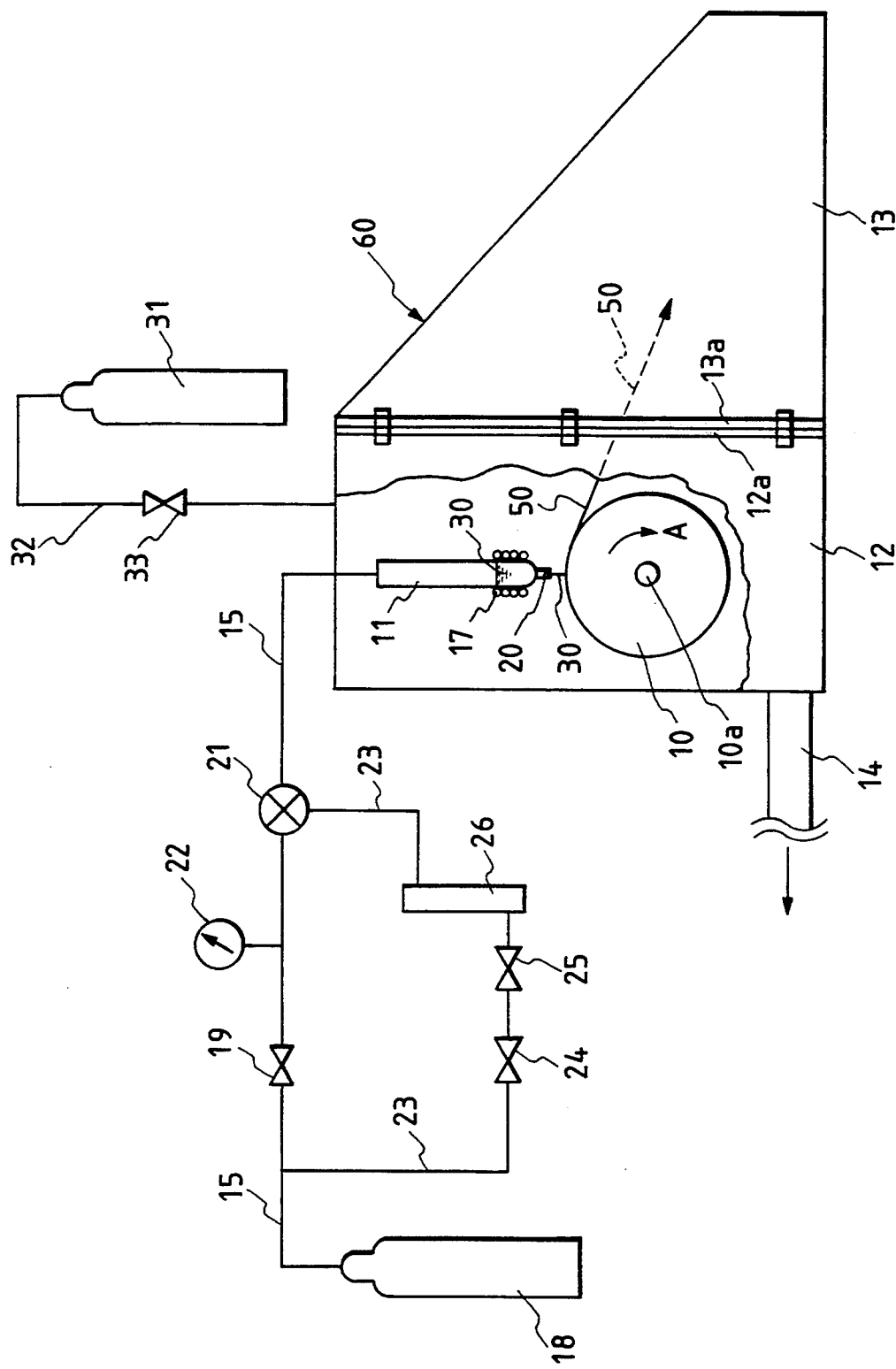
FIG. 7 is a schematic side view of the apparatus used for carrying out the process for continuously producing an Fe-based soft magnetic alloy ribbon according to still another embodiment of the present invention.

FIG. 7 shows an example of the apparatus used in the practice of the process of the invention. The apparatus shown in FIG. 7 is basically constructed next to a chamber 60 in which the cooling roll 10 and a crucible 11 are housed.

The chamber 60 has a box-like body 12, which houses therein the cooling roll 10 and the crucible 11; and a box-like housing 13 connected to the body 12. The body 12 and the housing 13 are bolted together through flange portions 12a and 13a, respectively, so that the connected portion is of an airtight structure. Exhaust piping 14, which is connected to an evacuating apparatus, is connected to the body 12 of the chamber 60.

The cooling roll 10 is supported by a rotary shaft 10a penetrating the side walls of the chamber 60. The cooling roll 10 is driven to rotate by a motor (not shown) provided outside the chamber 60 through the rotary shaft 10a. The portions of the side walls at which the rotary shaft 10a penetrates therethrough are provided with a magnetic seal and rendered airtight.

On the lower end of the crucible 11 is provided the nozzle 20. A heating coil 11 is provided on the lower part of the crucible 11. Inside the crucible 11 is housed the molten metal 30 of an Fe-soft magnetic alloy.

The upper part of the crucible 11 is connected to a gas source 18 for supplying a gas such as Ar gas through a supply piping or connecting pipe 15, which has incorporated therein a pressure control valve 19 and a magnetic valve 21. In the midway portion of the supply piping 15 between the pressure control valve and the magnetic valve 21 is provided a pressure gauge 22. An auxiliary piping 23 is connected to the piping 15 in parallel therewith. The auxiliary piping 23 has incorporated therein a pressure control valve 24, a flow rate control valve 25 and a flowmeter 26. That is, a gas such as Ar can be supplied from the gas source 18 to the inside of the crucible 11 so that the molten metal can be sprayed onto the cooling roll 10 from the nozzle 20.

To the ceiling portion of the chamber 60 is connected a gas source 31 for supplying a gas such as Ar gas through a connecting pipe 32, which has incorporated therein a pressure control valve 33 so that Ar gas or the like can be sent to the inside of the chamber 60.

The cooling roll 10 and the nozzle 20 in the apparatus shown in FIG. 7 are substantially of the same construction as those in the conventional apparatus shown in FIG. 1. That is, the cooling roll 10 is rotated at a high speed, and while it is being rotated, the molten metal 30 is blown onto the roll from a nozzle 20 arranged in the vicinity of the top of the cooling roll 10 to thereby quench and solidify the molten metal 30 in the form of a ribbon, which is then withdrawn in the same direction as the direction in which the cooling roll 10 is rotated.

Major difference between the cooling roll 10 and the conventional cooling roll 1 is in that the cooling roll 10 is made of an Fe-based alloy. That is, the cooling roll 10 is constructed by an Fe-based alloy such as stainless steel. It should be noted that only outer peripheral surface portion of the cooling roll 10 need be made of the Fe-based alloy.

Desirably, the outer peripheral surface portion of the cooling roll 10 is finished to have a surface roughness larger than mirror surface-finished one by being polished with a polishing paper having a grain number 600 to 1,000, preferably 800. By so doing, the surface roughness values on the both sides of the ribbon 50 are made substantially uniform.

As described above, the surface roughness values of both sides of the ribbon can be made sufficiently small and uniform by making the surface of the cooling roll 10, or at least outer peripheral surface portion of the cooling roll 10, to have a surface roughness corresponding to that obtainable by polishing with a polishing paper having a grain number of 600 to 1,000, preferably 800. Therefore, the apparatus according to the instant embodiment of the present invention is suitable as an apparatus for continuously producing a soft magnetic alloy ribbon useful as a material for magnetic heads, particularly acoustic magnetic heads.

As for the molten metal 30 is a molten metal of the Fe-based soft magnetic alloy having a composition represented by formula (I) as defined above.

Next, production of an Fe-based soft magnetic alloy ribbon using the apparatus shown in FIG. 7 will be described hereafter.

In producing a soft magnetic alloy ribbon, the inside of he chamber 60 is evacuated and then a non-oxidative gas such as Ar gas is sent to the chamber 60 thus evacuated from the gas source 31. On the other hand, Ar gas is pressed into the inside of the crucible 11 to thereby eject the molten metal 30 from the nozzle 20, and at the same time the cooling roll 10 is rotated at a high speed in the direction indicated by an arrow A in FIG. 7. Hence, the molten metal 30 is extruded along the surface of the cooling roll 10 while forming the puddle 40 on the top of the cooling roll 10 to form the ribbon 50. The ribbon 50 is mostly composed of an amorphous phase.

Here, the outer peripheral surface portion of the cooling roll 10 is made of an Fe-based alloy, which is excellent in its wettability with the Fe-based soft magnetic alloy, thus facilitating separation of the ribbon 50 from the cooling roll 10 so that the ribbon 50 obtained has a uniform thickness. On the contrary, it is undesirable to use the cooling roll 10 made of a metal other than the Fe-based alloy, e.g., a roll made of Cu or the like, because in this case the molten metal is scattered when it is ejected from the nozzle 20 and fails to produce ribbons of a good shape.

Further, because the surface of the cooling roll 10 is formed to have a suitable roughness, the ribbon 50 is prevented from slipping on the cooling roll 10, resulting in that the ribbon 50 has a sufficiently small surface roughness on both sides.

Further, because the crucible 11 and the cooling roll 10 and the neighborhood thereof are covered with non-oxidative gas, the molten metal 30 being quenched is not oxidized nor is the ribbon 50 withdrawn from the cooling roll 10 after quenching oxidized.

Upon continuously producing the ribbon 50 by continuously ejecting the molten metal 30 from the crucible 11 onto the cooling roll 10, the ribbon 50 withdrawn from the cooling roll 10 is stored in the housing 13 in the chamber 60. Because the ribbon 50 is in a preheated state and still at a high temperature, it otherwise tends to be oxidized upon exposure to the air but the inside of the chamber 60 is filled with Ar gas, which prevents oxidation in the chamber 60 from occurring.

When the continuous production of the ribbon 50 is over and the temperature of the ribbon 50 stored in the housing 13 decreases down to room temperature, the body 12 and the housing 13 of the chamber 60 are separated in order to take out the ribbon 50.

Annealing of the ribbon 50 thus obtained by heating at a temperature of 500° to 620° C. followed by gradual cooling leads to crystallization of non-uniform amorphous phase in the ribbon 50, and as result there are formed a number of regions where local crystallization is ready to occur, thus forming non-uniform nuclei. This makes the resulting texture finer, and consequently gives rise to a fine crystalline texture containing crystal grains of a size of about 100 to 200 Å. As a result, a Fe-based soft magnetic alloy ribbon having a high saturated magnetic flux density and a high permeability as well as exhibiting excellent soft magnetic characteristics and being very hard and excellent in thermal resistance can be obtained.

In the above-described process for continuously producing a ribbon, the apparatus used may be that shown in FIG. 7 but uses the same slanted nozzle as shown in FIGS. 3 and 4. In this case, the nozzle 20 is slanted on the side which causes no obstacle in withdrawing the resulting ribbon 50.

As explained above, the surface roughness values of the both sides of the ribbon can be made sufficiently small and uniform by making the surface of the cooling roll 10, or at least outer peripheral surface portion of the cooling roll 10, to have a surface roughness corresponding to that obtainable by polishing with a polishing paper having a grain number of 600 to 1,000, preferably 800. Therefore, the apparatus according to the instant embodiment of the present invention is suitable as an apparatus for continuously producing a soft magnetic alloy ribbon useful as a material for magnetic heads, particularly acoustic magnetic heads.

(3) Powder Compact

The use of soft magnetic alloy powder having the specified composition in the production of powder compact makes it possible to obtain a powder compact made of a soft magnetic alloy powder being compressed and having a high saturated magnetic flux density and a high permeability as well as having a high mechanical strength and a high thermal stability.

Investigation made by the present inventors has revealed that the above-described soft magnetic alloy having the specified composition becomes brittle upon heating, and therefore the alloy can readily be powdered by being pulverized in this state.

Powder of the high saturated magnetic flux density Fe-based soft magnetic alloy according to the present invention can be prepared usually by a process including a step of quenching a molten metal of a soft magnetic alloy having a composition represented by formula (I) as defined above by an atomizing method or the like to convert it into powder, and a step of heating the powder obtained in the preceding step to deposit fine crystal grains. In the production of the above-described powder of the soft magnetic alloy, the powder can also be prepared by preparing an alloy having a composition represented by formula (I) as defined above, heating the alloy at a temperature no lower than the crystallization temperature thereof to render it brittle, and then pulverizing it.

In order to obtain the powder of a magnetic alloy, by atomizing, the alloy material having the above-described composition is melted in a crucible using a high frequency still and the molten metal is poured down through a nozzle for ejecting the molten metal provided on the bottom of the crucible, with blowing nitrogen gas at a predetermined pressure through a multi-hole atomizing nozzle arranged, for example, in a circle, around the molten metal flowing from the nozzle for ejecting the molten metal.

Investigation made by the present inventors has revealed that the above-described soft magnetic alloy having the specified composition becomes brittle upon heating, and therefore the alloy can be powdered utilizing this property. Alternatively, powder can be obtained by heating the alloy having the aforementioned composition at a temperature no lower than the crystallization temperature thereof, preferably 550° to 650° C., to render it brittle and pulverizing it in this state to adjust its particle diameter.

Next, explanation will be made on the powdering of the alloy obtained as described above.

The above-described alloy is transformed into an amorphous phase texture in a quenched state and therefore is rich in ductility so that it is difficult to pulverize as it is in order to obtain its powder. Accordingly, the alloy obtained as above is heated at a temperature of 500° C. or higher to embrittle it and is then pulverized in this state using a grinder such as a roll mill or an attritor. As a result of this operation, a soft magnetic alloy powder having a particle diameter of about 1 to about 100 μm. can be obtained.

Next, explanation will be provided for the production of powder compact, for example a magnetic head core.

Figure 8:
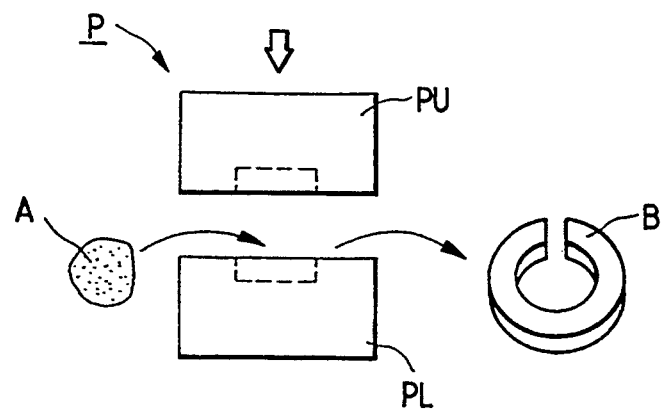
FIG. 8 is a diagrammatic view of the conventional press used for forming molded core from the soft magnetic alloy powder according to one embodiment of the present invention.
Figure 9A:
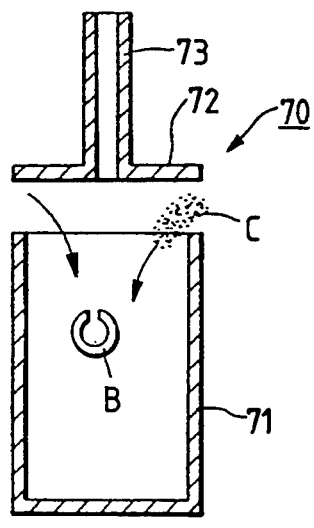
FIGS. 9A, 9B and 9C are each a schematic cross-sectional view of the pressurizing capsule, illustrating the procedure of introducing the molded core into the pressurizing capsule.
Figure 9B:
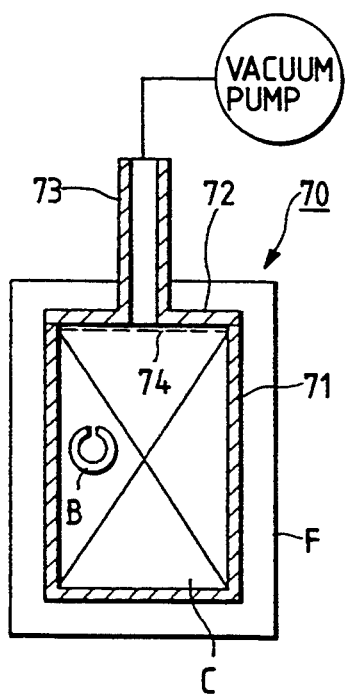
Figure 9C:
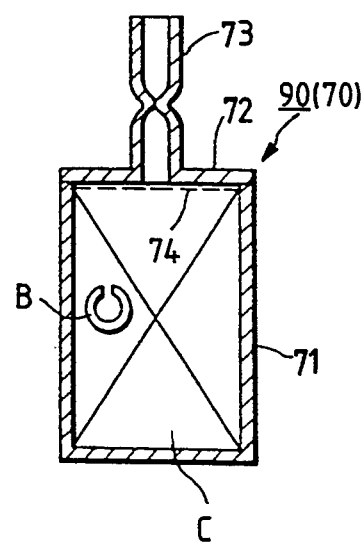

First, as shown in FIG. 8, a soft magnetic alloy powder A is molded into a core B having a predetermined shape using a top mold PU and a bottom mold PL of a press P. The molded core B is then inserted and sealed in a pressurizing capsule 70 shown in FIGS. 9A, 9B and 9C together with a pressure medium powder C. In FIGS. 9A to 9C, only one molded core B is illustrated but in practice a plurality of molded cores B are inserted and sealed in the pressurizing capsule 70.

The pressurizing capsule 70 has a cylindrical body 71 with a bottom and a detachable cover or lid 72 on the body 71. A deaering pipe 73 has an opening in the cover 72. In the pressurizing pressure 70 are introduced the molded core B and the capsule medium powder C in a state in which the cover is detached. Then a mesh plate 74 which does not allow passage of the molded core B and the pressure medium powder C therethrough is placed on the inner surface of the body 71 on the upper part thereof, followed by welding the body 71 and the cover 71 to seal gaps therebetween. Then, the deaering pipe 73 is collapsed to be discommunicated with the outside, thus completing a sealed work 90 (pressurizing capsule 70) in which the molded core B and the pressure medium powder C are included.

Upon deaering, the pressuring capsule 70 is introduced in a heating furnace F and heated at a temperature of about 500° to 900° C. This heat treatment is intended to more completely effect degasification as commonly carried out for this kind of deaeration.

The pressure medium powder C is selected from materials which do not undergo chemical reaction with the soft magnetic alloy powder A (molded core B). Here, the molded core B is made of the Fe-based soft magnetic alloy powder having the aforementioned composition, favorable results are obtained when $ZrO_2$ powder is used as the pressure medium powder C. In addition thereto, MgO powder may also be used.

Figure 10:
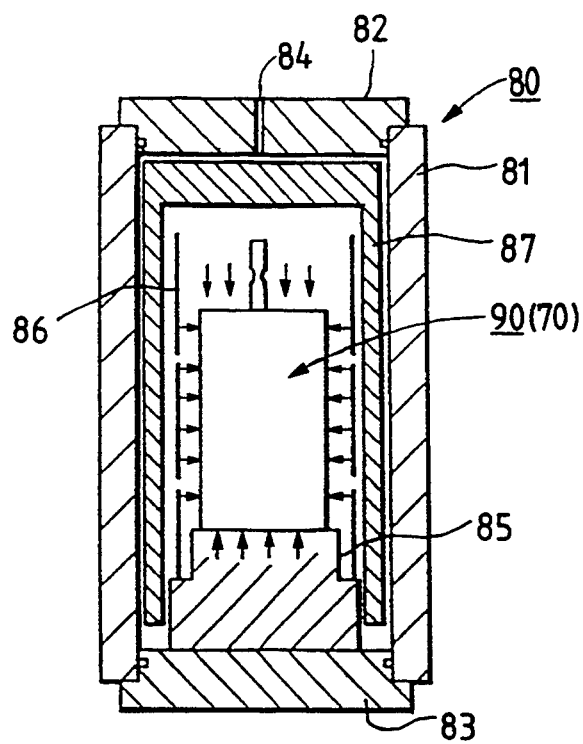
FIG. 10 is a schematic cross-sectional view of the hot hydraulic press for pressurizing therein the pressurizing capsule shown in FIGS. 9A, 9B and 9C, at a high temperature.

FIG. 10 is a schematic cross-sectional view of a hydraulic hot press 80, in which a high pressure cylinder 81 is closable at both upper and lower ends with an upper lid 82 and a lower lid 83, respectively. A high pressure gas conduit 84 has an opening in the upper lid 82. In the high pressure cylinder 81 are arranged a stand 85 for supporting the work 90 and a heater 86 and an insulation layer 87 is provided between the high pressure cylinder 81 and the heater 86.

The work 90 is mounted on the stand 85 and heated by the heater 86 to a high temperature, and at the same time there is applied an isotropic pressure by means of a high pressure gas used as a pressure medium introduced therein through the conduit 84. As a result, the work 90 (capsule 70) is deformed wholly by compression. During the compression deformation, the molded core B in the capsule 70 is exposed to isotropic pressure through the pressure medium powder C. Also, it receives the heat from the heater 86 through the pressure medium powder C. From this it follows that no abrupt heating of the molded core B occurs and hence no crack nor deformation due to abrupt heating occurs in the molded core B. That is, the molded core B is uniformly or isotropically compressed with bubbles inside being removed and then finally sintered to complete a magnetic head core D. The magnetic head core D thus obtained shrinks more than the molded core B and hence the shape of the molded core B is determined taking into consideration the amount of such shrinkage.

Figure 11:
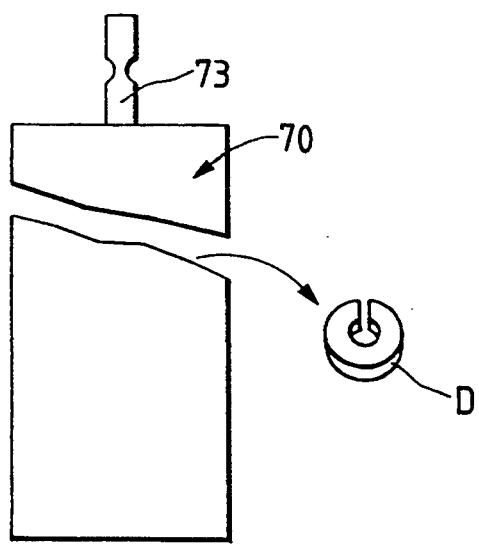
FIG. 11 is a schematic cross-sectional view of the hot hydraulic press from which the pressurizing capsule shown in FIGS. 9A, 9B and 9C, is taken out.

The work 90 compression deformed as described above is taken out from the hot hydraulic press, and thereafter the body 71 and the lid 72 are broken as shown in FIG. 11 for taking out the complete magnetic head core D inside the work 90. Because the magnetic head core D is processed in advance so as to have a predetermined shape, it can be used as it is without further processing as a magnetic head core.

In the hot hydraulic press, the molded core B is covered entirely with the pressure medium powder C which does not undergo chemical reaction with the core B, and therefore there is no fear that the complete magnetic head core D suffer from change in the properties.

While in the above description, explanation has been made on the production of the magnetic head core D, application of the process is not limited to the production of magnetic head cores but the process can be used widely as a production method for producing magnetic cores for use in transformers, electric motors, choke coils and the like by properly changing the shape of the upper and bottom molds of the press.

Figure 12:
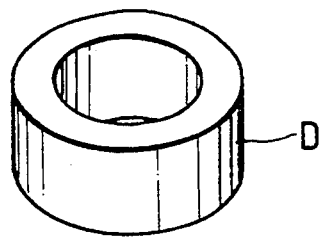
FIG. 12 is a perspective view of the magnetic core according to one embodiment of the present invention.
Figure 13:
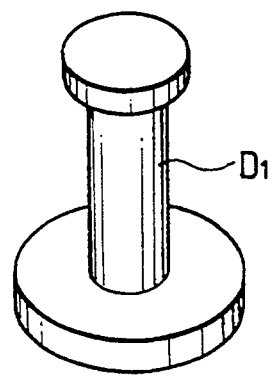
FIG. 13 is a perspective view of the magnetic core in the form of a drum according to another embodiment of the present invention.

Also, it is easy to form an annular magnetic core D as shown in FIG. 12 and a drum type magnetic core $D_1$ as shown in FIG. 13 by powdering the Fe-based soft magnetic alloy having a composition represented by formula (I) as defined above in the same manner as described above, and molding and compacting using the apparatus shown in FIGS. 8, 9A to 9C, 10 and 11 by properly changing the shape of the mold of the press P. Needless to say, the process of the invention can be applied to production of various types of magnetic cores such as magnetic cores for antennae in the form of a rod or plate, multi-hole type magnetic cores, screw type magnetic cores, cup type magnetic cores, pot type magnetic cores or magnetic cores of other shapes.

Utilizing a ribbon of the Fe-based soft magnetic alloy according to the present invention, transformers can be produced.

Figure 14:
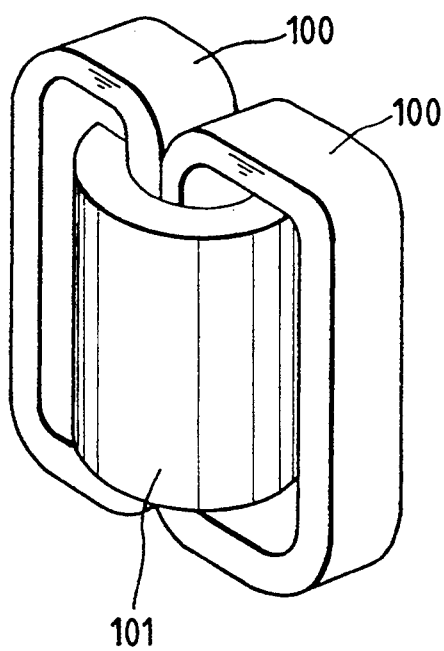
FIG. 14 is a schematic perspective view of the low frequency transformer according to one embodiment of the present invention.
Figure 15:
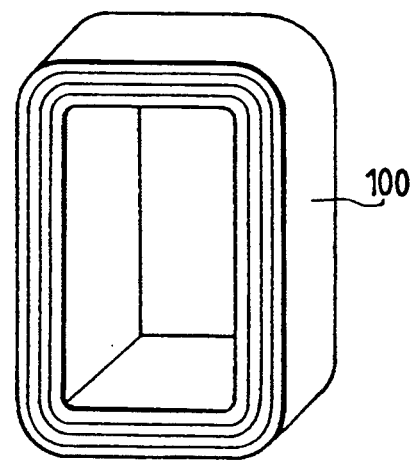
FIG. 15 is a schematic perspective view of the magnetic core assembled in the low frequency transformer shown in FIG. 14.

FIG. 14 shows the transformer according to one embodiment of the present invention. Transformer T includes a pair of magnetic cores 100 and 100 and a wiring 101 wound around the magnetic cores 100 and 100 main elements. The magnetic core 100 is formed by winding a ribbon of the alloy several times to form a laminate. The ribbon is formed of a soft magnetic alloy ribbon and an insulating layer of MgO or the like formed on one surface of the ribbon. As an example of the soft magnetic alloy constituting the above-described ribbon, there can be used a high saturated magnetic flux density Fe-based soft magnetic alloy having a composition represented by formula (I) as defined above. The alloy mostly has a saturated magnetic flux density of usually 10 kG or higher. However, for low frequency transformers, it is preferred to use the one having a saturated magnetic flux density of 13 kG or higher with view to reducing the size of the transformer. According to the above-described process, a ribbon having a width of about several tens millimeters (mm) and a thickness of 20 to 40 μm can be obtained. Upon production of the ribbon, an insulating layer of MgO or the like is formed on the ribbon by a conventional method such as electrophoresis, metallizing, sputtering or vapor deposition. By winding the ribbon with the insulating layer inside, the magnetic core 101 as shown in FIG. 15 can be obtained.

Then, the magnetic core 101 is retained at a temperature of 500° to 700° C. for 1 hour and quenched by water quenching or the like technique to quench it, followed by annealing, to crystallize the Fe-based soft magnetic alloy constituting the magnetic core 101. This crystallization improves the magnetic characteristics and thermal resistance of the magnetic core, thus giving the objective magnetic core 101.

The low frequency transformer thus obtained which is constructed by an Fe-based soft magnetic alloy having a high saturated magnetic flux density and a high permeability, exhibits excellent magnetic characteristics, and at the same time, the alloy itself has been heat treated at a temperature 6f no lower than 500° C., therefore it naturally exhibits an excellent thermal resistance.

Therefore, according to the present invention, there can be obtained transformers suitable for transformers for power distribution used at commercial frequencies or inverter transformers used at low frequencies Further, a magnetic head can be produced which has a laminate type core to which is applied a ribbon made of the Fe-based soft magnetic alloy according to the present invention.

Figure 16:
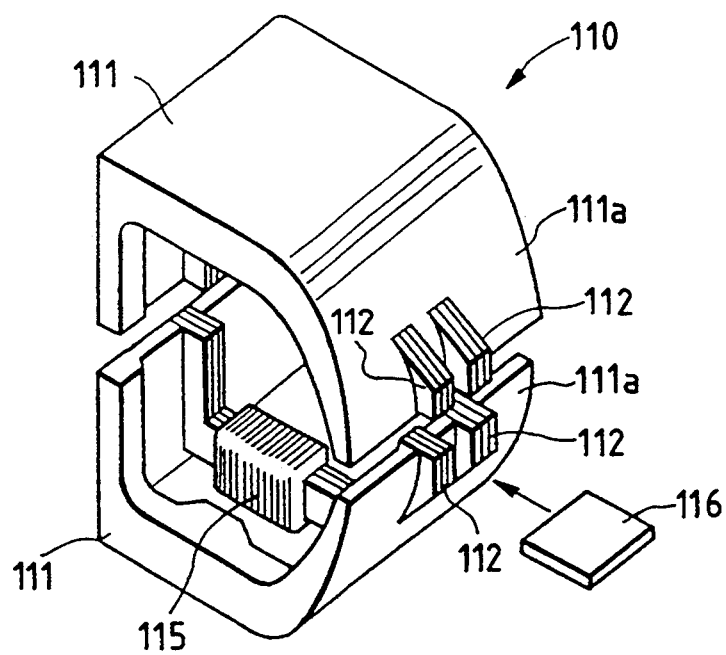
FIG. 16 is a partially exploded perspective view of the magnetic head having the laminate type core made of the Fe-based soft magnetic alloy according to one embodiment of the present invention.

As shown in FIG. 16, the magnetic head 100 with a laminate type core according to an embodiment of the present invention has a pair of symmetrically split holding cases 111 and 111 for fixing various elements to respective predetermined positions. Each of the holding cases 111 and 111 has a slidable contact surface 111a which is arcuate on one side thereof so that it can achieve a smooth sliding action facing a magnetic tape. Opposing ends of the slidable contact surfaces 111a and 111a, respectively, are symmetrically provided with laminate type cores 112 and 112, respectively, each being formed by laminating together a plurality of sheets made of a thin magnetic material.

Figure 17A:
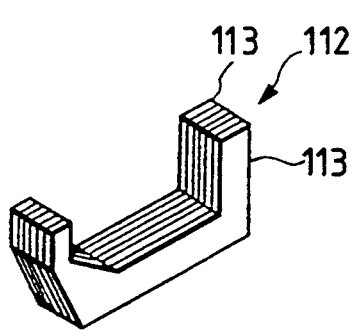
FIG. 17A is a perspective view of the laminate type core made of the Fe-based soft magnetic alloy according to one embodiment of the present invention.

As shown in FIG. 17A, the laminate type core 112 is made of a plurality of sheets of a magnetic material in the form of a substantially U-shaped core leaf 113 the sheet being laminated one on another. A pair of such laminate type cores 112 and 112 are butted to each other and the butting surface is defined as a magnetic gap 114.

Further, a coil 115 is wound around the laminate type core 112 and a gap plate 116 is placed as interrupting the magnetic gap 114 being inserted therein as shown in FIG. 16 to basically construct the magnetic head 110.

The laminate type core 112 includes a plurality of core leaves 113 punched out from the alloy ribbon and laminated one on another.

Leaves of the Fe-based soft magnetic alloy of the present invention having a suitable thickness, e.g., 30 mm, are subjected to pressing and barrel polishing to prepare core leaves 113.

Next, the leaves are annealed (600° C.) in the step of annealing. The annealed core leaves 113 are inserted in a jig and arranged in the same direction in an array in the step of aligning the core leaves 113 in order to be caused to be adhere closely to each other, and at the same time, for every predetermined number of the core leaves 113 a partition is inserted. Then the core leaves 113 and the partitions are welded in the direction of lamination by laser welding in a state where the core leaves 113 and the partitions are caused to adhere closely to each other Hence, by a simple separation operation in the subsequent core separation step, the core leaves are separated at the portion where partitions were inserted because no welding or only weak welding occurs at each portion where the partition was inserted, and thus the core leaves are laminated into a laminate having a predetermined number of core leaves. The laminates thus obtained are then dipped in a resin solution in a resin impregnation step to form an insulating resin film between the respective core leaves 113, thus giving the laminate type core 112 as shown in FIG. 17A.

Magnetic heads having more complicated shapes may be constructed as magnetic heads having a powder compact type core prepared by compacting powder of the Fe-based soft magnetic alloy according to the present invention.

Figure 18:
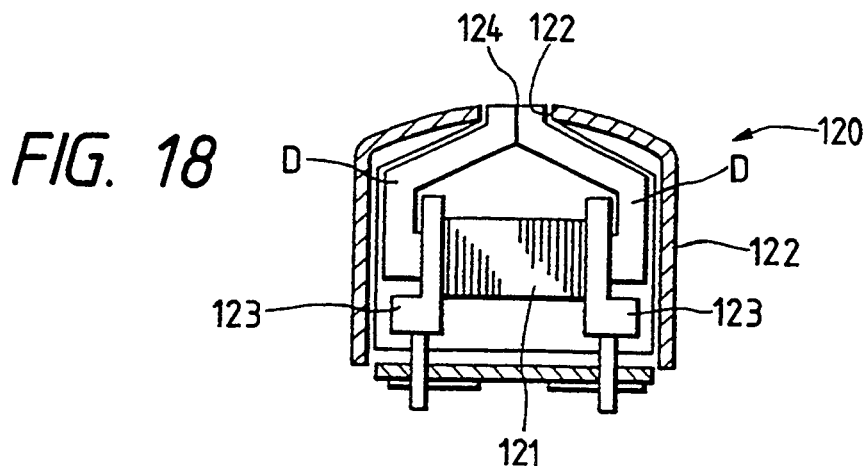
FIG. 18 is a cross-sectional view of the magnetic head having a compression molded type core made of the Fe-based soft magnetic alloy powder according to one embodiment of the present invention.

FIG. 18 shows a magnetic head 120 according to an embodiment of the present invention. The magnetic head 120 is used mainly for tape recorders, and is constructed by a magnetic head core D around which a coil 121 is wound and a holder 122 holding the magnetic head core D. A bobbin 123 is provided on each end of the coil 121. The magnetic head core is formed with a gap 124. The magnetic head core is produced by compacting the Fe-based soft magnetic alloy powder having a composition represented by formula (I) as defined above in the same manner as the production process of the powder compact described above.

Figure 19:
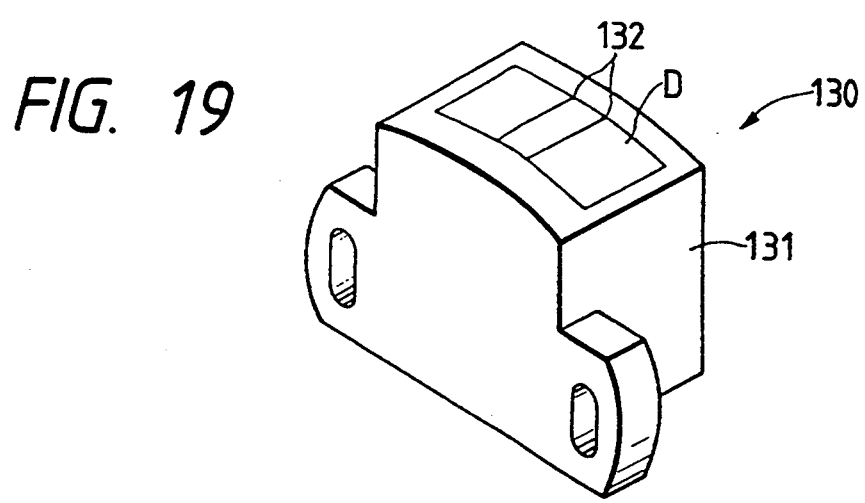
FIG. 19 is a perspective view of the magnetic head having the compression molded type core according to another embodiment of the present invention.

FIG. 19 shows a magnetic head according to another embodiment of the present invention. The magnetic head 130 is also used mainly for tape recorders. The soft magnetic alloy powder of the present invention is compacted in the same manner as the powder compact described above to form a magnetic head core D, around which is provided a holder 131 to complete basic construction of the magnetic head 130. In the surface of the magnetic head core D facing a magnetic recording medium are formed two gaps 132.

Figure 20:
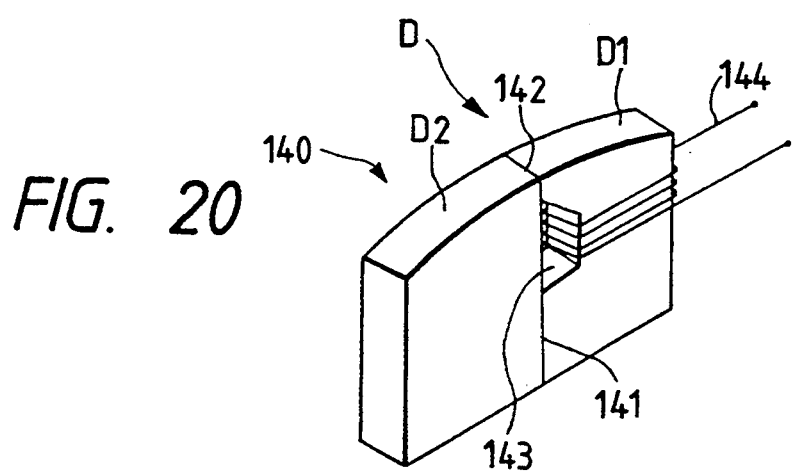
FIG. 20 is a perspective view of the magnetic head having the compression molded type core according to still another embodiment of the present invention.

FIG. 20 shows a magnetic head according to still another embodiment of the present invention. A magnetic head 140 is used mainly for VTRS (video tape recorder). First, the soft magnetic alloy powder of the present invention is compacted in the same manner as the production process of the powder compact described above to prepare a core half $D_1$ of a U-shaped structure and a plate-like core half $D_2$. These core halves are coupled at coupling surface 141 to form a magnetic head cord d, a gap 142 and as a groove 143 for wiring. The magnetic head 140 is basically constructed by winding a coil 144 around the groove 143 in the magnetic head core D.

EXAMPLES

Hereafter, the present invention will be described in greater detail by way of examples. However, the present invention should not be construed as being limited thereto.

Examples 1 to 8

Production of Alloy of Formula (Ia) and (Ib)

Alloys of Examples 1 to 8 hereinbelow were prepared by a single roll liquid quenching method. That is, a molten metal was ejected from a nozzle positioned above a single steel roll rotating in a predetermined direction under pressure applied by means of argon gas onto the surface of the cooling roll to quench it to obtain a ribbon. The ribbon thus produced was about 15 mm in width and about 20 to 40 μm thick.

Permeability was measured by an inductance method, which was carried out using a solenoid prepared by processing the ribbon into a ring having an outer diameter of 10 mm and an inner diameter of 5 mm, superimposing a plurality of such rings to form a laminate, around which was wound a coil. Measurement of effective permeability ($\mu e$) was conducted under the conditions of 10 mOe and 1 kHz. Coercive force (Hc) was measured using a direct current B-H loop tracer. Saturated magnetic flux density (Bs) was calculated from magnetization measured using a VSM at 10 kOe. Unless otherwise indicated specifically, magnetic characteristics referred to in Examples 1 to 8 below were on the material quenched in water after retaining at a temperature of 500° to 700° C. for 1 hour

Example 1

Effects of heat treatment on the magnetic characteristics and structure of the alloy of the present invention were examined taking an $Fe_{86}Zr_7B_6Cu_1$ alloy as an example. The crystallization initiation temperature of the $Fe_{86}Zr_7B_6Cu_1$ alloy measured by differential thermal analysis conducted at a temperature elevation rate of 10° C./min. was 503° C.

Figure 21:
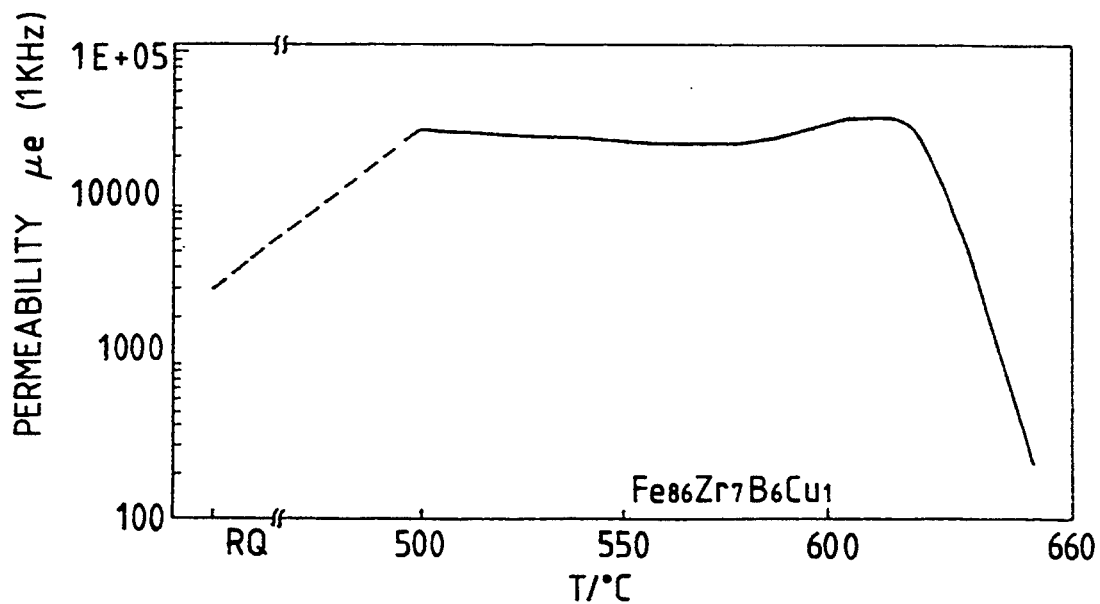
FIG. 21 is a graph showing the relationship between the effective permeability and annealing temperature of the alloy of the present invention.

FIG. 21 is a graph showing effects of annealing (quenching in water after retaining at a predetermined temperature for 1 hour) on the effective permeability of the $Fe_{86}Zr_7B_6Cu_1$ alloy.

From FIG. 21, it can be seen that the effective permeability of the alloy of the invention in a quenched state. (RQ) is at a low level as low as that an Fe-based amorphous alloy but reaches a high value by about 10 times as high as the value obtained in the quenched state by effecting annealing at 500° to 620° C. Here, upon examination on dependency of the permeability on the frequency using a specimen having a thickness of about 20 μm subjected to heat treatment at 600° C., it was found that the permeability was 32,000 at 1 kHz, 25,600 at 10 kHz and 8,330 at 100 kHz, indicating that even at high frequencies tested, excellent soft magnetic characteristics were obtained. Further, examination on the effect of cooling rate on the permeability revealed that the alloy of the invention had an effective permeability of 32,000 by quenching in water after retaining at 600° C. for 1 hour, but after cooling in the air it had an effective permeability of 18,000, thus indicating that the cooling rate after heat treatment was important.

Therefore, the magnetic characteristic of the alloy of the present invention can be controlled by properly selecting conditions of heat treatment so that they can be optimized, and the magnetic characteristics can also be improved by annealing in a magnetic field.

Next, changes in structure of the $Fe_{86}Zr_7B_6Cu_1$ alloy by heat treatment were examined by X-ray diffraction method, and the texture of the alloy after the heat treatment was observed using a transmission electron microscope. Results obtained are shown in FIGS. 22 and 23.

Figure 22:
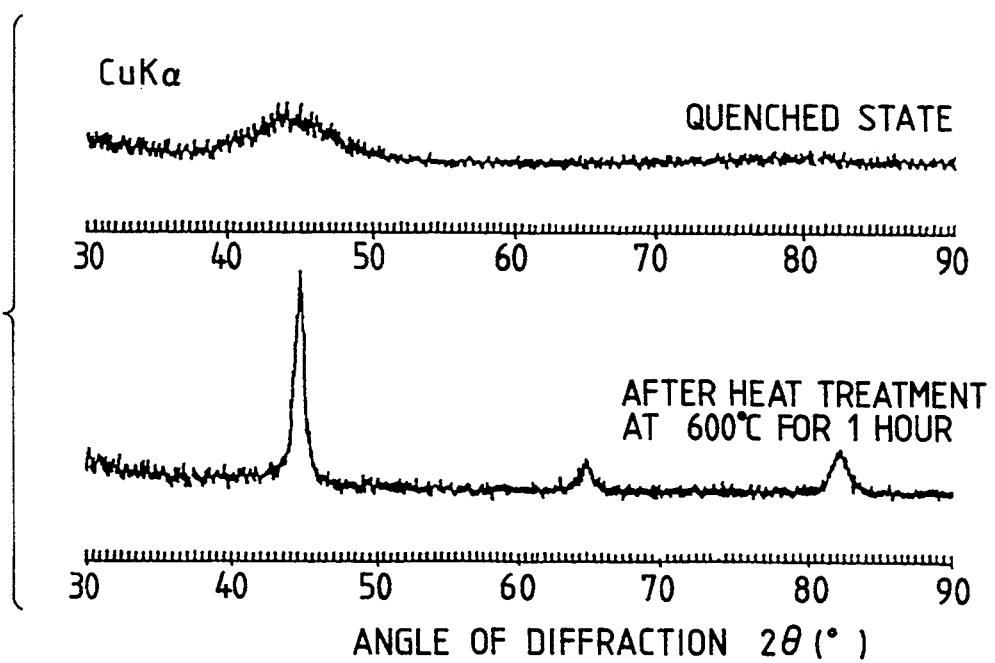
FIG. 22 is a graph showing X-ray diffraction pattern of an example of the alloy of the invention, illustrating difference in structure before and after heat treatment.
Figure 23:
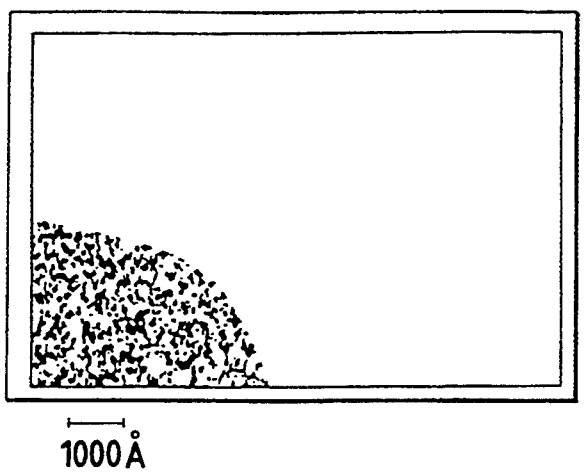
FIG. 23 is a schematic electron micrograph of an example of the alloy of the present invention illustrating the texture after heat treatment.

As will be apparent from FIG. 22, a halo diffractive pattern characteristic of amorphous structure was obtained in a quenched state and a diffractive pattern characteristic of body centered cubic crystals was observed after the heat treatment. This indicates that the structure of the alloy of the invention is changed from amorphous state to body centered cubic crystal. FIG. 23 indicates that the texture after the heat treatment is composed of fine crystal grains having a particle diameter of about 100 Å. Further, examination on changes in hardness of the $Fe_{86}Zr_7B_6Cu_1$ alloy by heat treatment revealed that Vickers hardness of the alloy increased from 740 DPN in a quenched state to 1,390 DPN, which was much higher than was attained by the conventional material, after heat treatment at 650° C. for 1 hour. This indicates that the alloy of the invention is suitable as a material for magnetic heads.

Then, examples are shown in which the amounts of Zr and of B in the above-described alloy were changed. Table 1 below and FIG. 24 show magnetic characteristics after annealing.

TABLE 1

| Run No. | Composition of Alloy (at. %) | Permeability μe(1 K) | Coercive Force Hc(Oe) | Saturated Magnetic Flux Density Bs(kG) |
|---|---|---|---|---|
| 1 | $Fe_{85}Zr_4B_{10}Cu_1$ | 9,250 | 0.150 | 14.9 |
| 2 | $Fe_{83}Zr_4B_{12}Cu_1$ | 7,800 | 0.170 | 14.2 |
| 3 | $Fe_{88}Zr_5B_8Cu_1$ | 15,500 | 0.190 | 16.7 |
| 4 | $Fe_{86}Zr_5B_8Cu_1$ | 23,200 | 0.032 | 15.2 |
| 5 | $Fe_{82}Zr_5B_{10}Cu_1$ | 21,100 | 0.055 | 14.5 |
| 6 | $Fe_{82}Zr_5B_{12}Cu_1$ | 12,000 | 0.136 | 13.9 |
| 7 | $Fe_{89}Zr_6B_4Cu_1$ | 30,300 | 0.008 | 17.0 |
| 8 | $Fe_{88}Zr_6B_5Cu_1$ | 15,200 | 0.052 | 16.3 |
| 9 | $Fe_{87}Zr_6B_6Cu_1$ | 18,300 | 0.040 | 15.7 |
| 10 | $Fe_{86}Zr_6B_7Cu_1$ | 15,400 | 0.042 | 15.2 |
| 11 | $Fe_{91}Zr_7B_1Cu_1$ | 20,700 | 0.089 | 17.1 |
| 12 | $Fe_{90}Zr_7B_2Cu_1$ | 32,200 | 0.030 | 16.8 |
| 13 | $Fe_{89}Zr_7B_3Cu_1$ | 32,400 | 0.036 | 16.2 |
| 14 | $Fe_{88}Zr_7B_4Cu_1$ | 31,300 | 0.102 | 15.8 |
| 15 | $Fe_{87}Zr_7B_5Cu_1$ | 31,000 | 0.082 | 15.3 |
| 16 | $Fe_{86}Zr_7B_6Cu_1$ | 32,000 | 0.044 | 15.0 |
| 17 | $Fe_{84}Zr_7B_8Cu_1$ | 25,700 | 0.044 | 14.2 |
| 18 | $Fe_{82}Zr_7B_{10}Cu_1$ | 19,200 | 0.038 | 13.3 |
| 19 | $Fe_{80}Zr_7B_{12}Cu_1$ | 23,800 | 0.044 | 12.5 |
| 20 | $Fe_{78}Zr_7B_{14}Cu_1$ | 13,300 | 0.068 | 11.8 |
| 21 | $Fe_{76}Zr_7B_{16}Cu_1$ | 10,000 | 0.20 | 11.1 |
| 22 | $Fe_{88}Zr_8B_3Cu_1$ | 29,800 | 0.084 | 15.4 |
| 23 | $Fe_{85}Zr_8B_6Cu_1$ | 28,000 | 0.050 | 14.2 |
| 24 | $Fe_{84}Zr_8B_7Cu_1$ | 20,400 | 0.044 | 13.8 |
| 25 | $Fe_{88}Zr_9B_2Cu_1$ | 11,700 | 0.112 | 15.1 |
| 26 | $Fe_{86}Zr_9B_4Cu_1$ | 12,900 | 0.160 | 14.3 |
| 27 | $Fe_{84}Zr_9B_6Cu_1$ | 11,800 | 0.108 | 13.1 |
| 28 | $Fe_{85}Zr_{10}B_4Cu_1$ | 6,240 | 0.210 | 12.8 |
| 29 | $Fe_{83}Zr_{10}B_6Cu_1$ | 5,820 | 0.220 | 12.0 |

Figure 24:
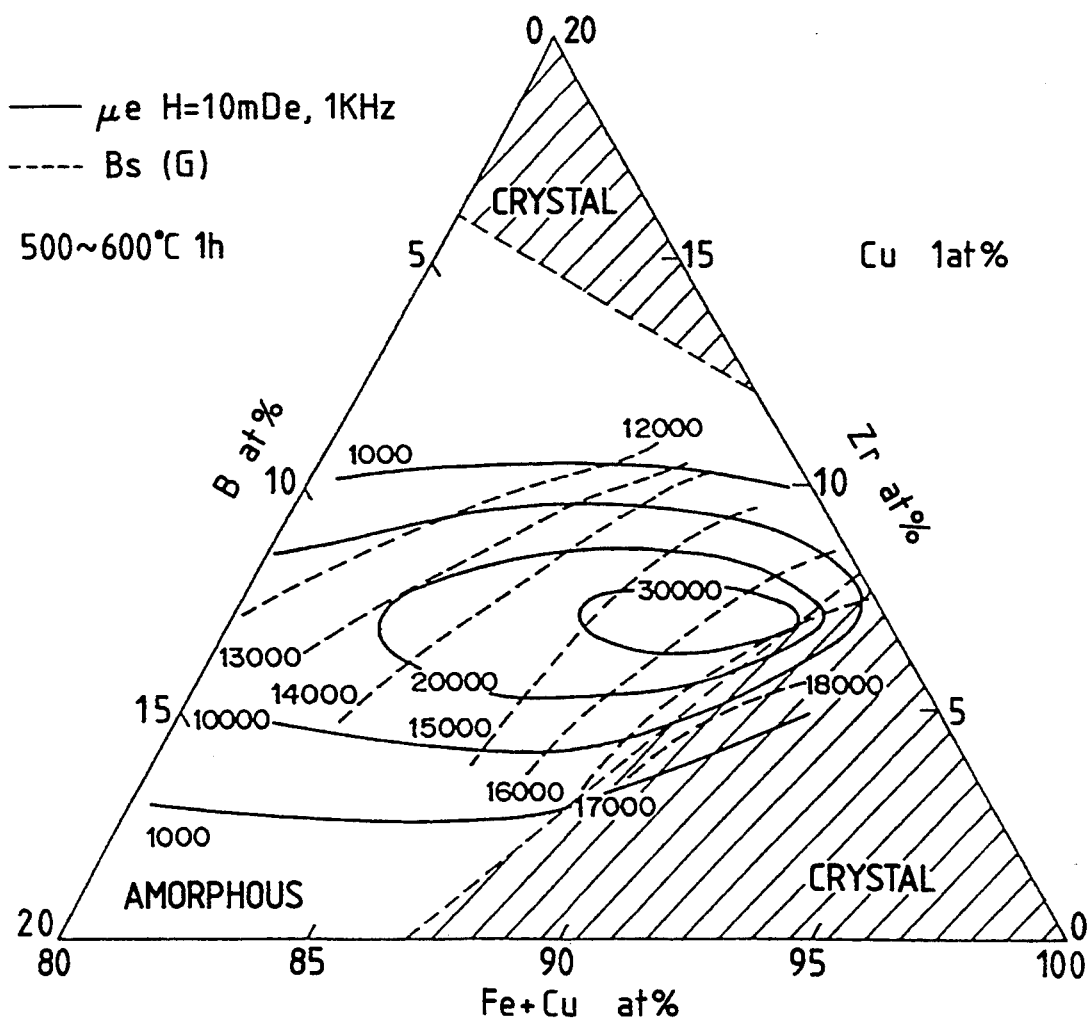
FIG. 24 is a triangular composition diagram of an example of the alloy of the present invention, illustrating variation of the magnetic characteristics with varied amounts of Zr and of B.

FIG. 24 indicates that a high permeability can readily be obtained when the amount of Zr is within the range of 4 to 10 atomic % in the presence of Cu as the second additive element. With the amount of Zr being 4 atomic % or less, an effective permeability of 10,000 or higher is not obtained. The amount of Zr exceeding 10 atomic % is undesirable because not only the permeability decreases abruptly but also the saturated magnetic flux density also decreases.

Similarly, a high effective permeability as high as no lower than 10,000 can readily be obtained with the amount of B being within the range of 0.5 to 16 atomic %. Even when the amounts of Zr and of B are within the above range, no high permeability is obtained if the amount of Fe exceeds 92 atomic %.

Example 2

Next, Fe—Hf—B—Cu type alloys obtainable by replacing Zr in the alloy used in Example 1 by Hf are explained below.

Table 2 shows magnetic characteristics of various Fe—Hf—B—Cu type alloys in which the amounts of B and of Cu were fixed to 6 atomic % and 1 atomic %, respectively.

TABLE 2

| Run No. | Composition of Alloy (at. %) | Permeability $\mu_e$(1 K) | Coercive Force Hc(Oe) | Saturated Magnetic Flux Density Bs(kG) |
|---|---|---|---|---|
| 30 | $Fe_{89}Hf_4B_6Cu_1$ | 9,350 | 0.150 | 16.1 |
| 31 | $Fe_{88}Hf_5B_6Cu_1$ | 20,400 | 0.048 | 15.7 |
| 32 | $Fe_{87}Hf_6B_6Cu_1$ | 26,500 | 0.028 | 15.2 |
| 33 | $Fe_{86}Hf_7B_6Cu_1$ | 25,200 | 0.028 | 14.7 |
| 34 | $Fe_{85}Hf_8B_6Cu_1$ | 25,250 | 0.038 | 14.1 |
| 35 | $Fe_{84}Hf_9B_6Cu_1$ | 19,600 | 0.068 | 13.5 |
| 36 | $Fe_{83}Hf_{10}B_6Cu_1$ | 9,860 | 0.104 | 12.8 |
| 37 | $Fe_{86}Zr_4Hf_3B_6Cu_1$ | 39,600 | 0.032 | 14.8 |

Figure 25:
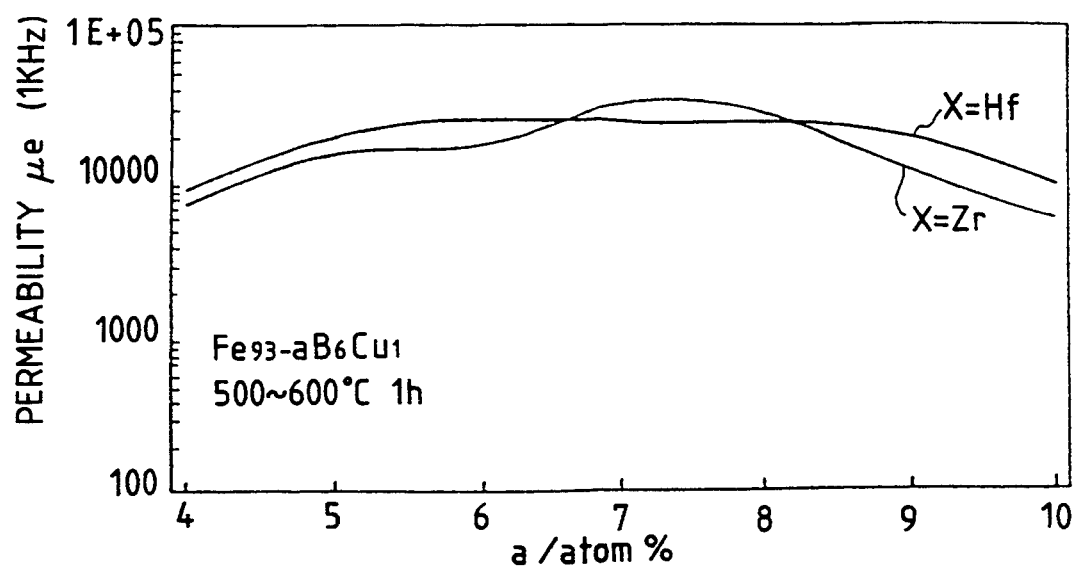
FIG. 25 is graph showing the relationship between the varied amount of Hf and permeability of an example of the alloy of the present invention.

FIG. 25 shows permeability when the amount of Hf was varied within the range of 4 to 10 atomic %. FIG. 25 also shows the effective permeability of each Fe—Zr—$B_6$—$Cu_1$ type alloy for comparison.

From FIG. 25, it can be seen that the effective permeability of the Fe—Hf—B—C type alloys is equal to that of the Fe—Zr—B—Cu type alloys when the amount of Hf is within the range of 4 to 10 atomic %. The magnetic characteristics of the $Fe_{86}Zr_4ZHf_3B_6Cu_1$ are equivalent to those of the Fe—Zr—B—Cu type alloys in Example 1. Therefore, Zr in the Fe—Zr—B—Cu type alloys in Example 1 can be replaced by Hf partly or entirely over the whole composition limitation range of 4 to 10 atomic %.

Example 3

Explanation will be made on replacement of a part of Zr and/or Hf in the Fe—(Zr, Hf)—B—Cu type alloys in Examples 1 and 2 by Nb.

Figure 26:
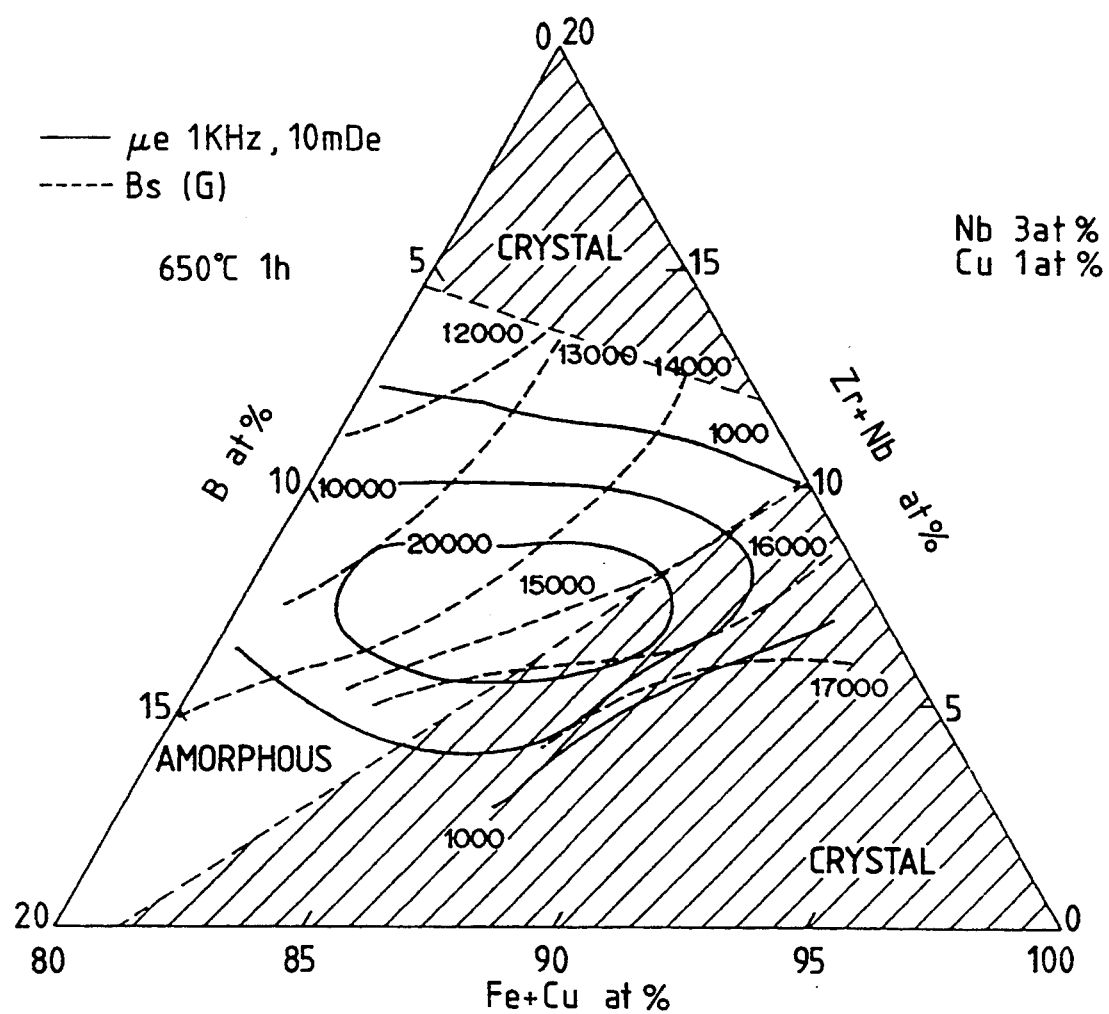
FIG. 26 is a triangular composition diagram of an example of the alloy of the present invention, illustrating variation of the magnetic characteristics with varied amounts of B and of Zr.

Table 3 shows results of replacement of a part of Zr in the Fe—Zr—B—Cu type alloys by 1 to 5 atomic % of Nb. FIG. 26 shows magnetic characteristics of the Fe—Zr—Nb—B—Cu type alloys containing 3 atomic % of Nb.

TABLE 3

| Run No. | Composition of Alloy (at. %) | Permeability $\mu_e$(1 K) | Coercive Force Hc(Oe) | Saturated Magnetic Flux Density Bs(kG) |
|---|---|---|---|---|
| 38 | $Fe_{88}Zr_4Nb_1B_6Cu_1$ | 11,300 | 0.108 | 16.9 |
| 39 | $Fe_{87}Zr_4Nb_2B_6Cu_1$ | 37,400 | 0.042 | 15.9 |
| 40 | $Fe_{86}Zr_4Nb_3B_6Cu_1$ | 35,700 | 0.046 | 15.3 |
| 41 | $Fe_{85}Zr_4Nb_4B_6Cu_1$ | 30,700 | 0.050 | 14.3 |
| 42 | $Fe_{84}Zr_4Nb_5B_6Cu_1$ | 14,600 | 0.092 | 13.7 |
| 43 | $Fe_{86}Zr_2Nb_3B_8Cu_1$ | 14,900 | 0.108 | 16.6 |
| 44 | $Fe_{84}Zr_2Nb_3B_{10}Cu_1$ | 15,900 | 0.085 | 16.2 |
| 45 | $Fe_{87}Zr_3Nb_3B_6Cu_1$ | 33,800 | 0.048 | 16.0 |
| 46 | $Fe_{85}Zr_3Nb_3B_8Cu_1$ | 24,100 | 0.095 | 15.5 |
| 47 | $Fe_{88}Zr_4Nb_3B_4Cu_1$ | 24,100 | 0.076 | 15.5 |
| 48 | $Fe_{84}Zr_4Nb_4B_8Cu_1$ | 36,700 | 0.038 | 14.6 |
| 49 | $Fe_{86}Zr_5Nb_5B_5Cu_1$ | 24,200 | 0.048 | 14.8 |
| 50 | $Fe_{84}Zr_5Nb_3B_7Cu_1$ | 21,700 | 0.038 | 14.0 |
| 51 | $Fe_{84}Zr_6Nb_3B_6Cu_1$ | 17,300 | 0.110 | 13.9 |
| 52 | $Fe_{82}Zr_6Nb_3B_8Cu_1$ | 20,400 | 0.045 | 13.2 |
| 53 | $Fe_{79}Zr_7Nb_3B_{10}Cu_1$ | 10,800 | 0.125 | 12.4 |

From FIG. 26, it can be seen that the amount of Zr+Nb which gives a high permeability is within the range of 4 to 10 atomic % as in the case of the amount of Nb in the Fe—Zr—B—Cu type alloys. In this range, high effective permeabilities as high as the Fe—Zr—B—Cu type alloys are obtained. Therefore, a part of Zr and/or Hf in the Fe—(Zr,Hf)—B—Cu alloys can be replaced by Nb.

Example 4

Next, explanation will be made on replacement of Nb in the Fe—(Zr,Hf)—Nb—B—Cu type alloys in Examples 3 by Ti, V, Ta, Mo or W. Table 4 shows magnetic characteristics of Fe—Zr—T—B—$Cu_1$ (T=Ti, V, Ta, Mo, W) type alloys.

TABLE 4

| Run No. | Composition of Alloy (at. %) | Permeability $\mu_e$(1 K) | Coercive Force Hc(Oe) | Saturated Magnetic Flux Density Bs(kG) |
|---|---|---|---|---|
| 54 | $Fe_{80}Zr_1Ti_6B_{12}Cu_1$ | 13,800 | 0.105 | 12.8 |
| 55 | $Fe_{86}Zr_4Ti_3B_6Cu_1$ | 12,700 | 0.110 | 14.7 |
| 56 | $Fe_{84}Zr_4V_5B_6Cu_1$ | 6,640 | 0.201 | 13.5 |
| 57 | $Fe_{86}Zr_4Ta_3B_6Cu_1$ | 20,900 | 0.096 | 15.1 |
| 58 | $Fe_{86}Zr_4Ta_3B_6Cu_1$ | 8,310 | 0.172 | 14.0 |
| 59 | $Fe_{86}Zr_4Mo_3B_6Cu_1$ | 9,410 | 0.160 | 15.3 |
| 60 | $Fe_{84}Zr_4Mo_5B_6Cu_1$ | 9,870 | 0.160 | 13.7 |
| 61 | $Fe_{86}Zr_4W_3B_6Cu_1$ | 11,700 | 0.098 | 14.8 |
| 62 | $Fe_{84}Zr_4W_5B_6Cu_1$ | 6,910 | 0.211 | 13.2 |

Each run in Table 4 exhibited magnetic characteristics superior to effective permeability of 5,000 usually obtained in Fe—based amorphous alloys. Therefore, Nb in the Fe—(Zr,Hf)—Mb—B—Cu type alloys can be replaced by Ti, V, Ta, Mo or W.

Example 5

Figure 27:
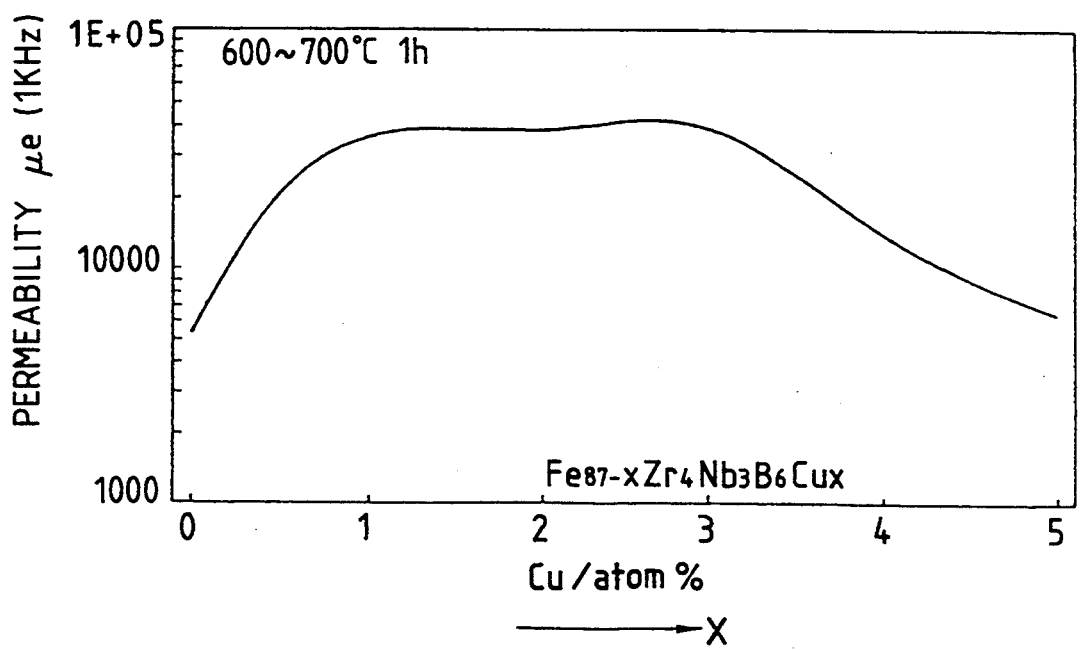
FIG. 27 is a graph showing the relationship between the varied amount of Cu and permeability of an example of the alloy of the present invention.

Then, explanation will be made on the reason why the content of Cu in the alloy of the present invention is limited within the specified range. FIG. 27 shows the relationship between the Cu content (z) in $Fe_{87}Zr_4Nb_3B_6Cu_x$ alloys and their permeability.

It can be seen from FIG. 27 that excellent magnetic characteristics or an effective permeability of 10,000 or higher is readily obtained within the range of z=0.2 to 4.5 atomic %. If z is 0.1 atomic % or less, the effect of Cu addition is not obtained efficiently but use of higher cooling rate results in improvement in the magnetic characteristics in this case too. On the other hand, z exceeding 4.5 atomic % is practically undesirable because in this case deterioration of permeability occurs.

Example 6

Next, explanation will be made on replacement of Cu in each alloy in Examples 1 to 5 by Ag, Ni, Pd or Pt. Table 5 shows magnetic characteristics of $Fe_{86}Zr_4Nb_3B_6T'_1$ (T'=Ag, Au, Ni, Pd, Pt) type alloys.

TABLE 5

| Run No. | Composition of Alloy (at. %) | Permeability $\mu_e$(1 K) | Coercive Force Hc(Oe) | Saturated Magnetic Flux Density Bs(kG) |
|---|---|---|---|---|
| 63 | $Fe_{86}Zr_4Nb_3B_6Ni_1$ | 17,900 | 0.072 | 15.4 |
| 64 | $Fe_{88}Zr_4Nb_3B_6Pd_1$ | 18,800 | 0.064 | 15.4 |
| 65 | $Fe_{86}Zr_4Nb_3B_6Pt_1$ | 19,900 | 0.096 | 14.8 |
| 66 | $Fe_{86}Zr_4Nb_3B_6Ag_1$ | 17,800 | 0.090 | 15.3 |
| 67 | $Fe_{86}Zr_4Nb_3B_6Au_1$ | 21,500 | 0.076 | 15.2 |

Table 5 shows that each alloy exhibited effective permeability of 10,000 or higher and as excellent magnetic characteristics as alloys containing Cu. Therefore, it is clear that Cu in the alloys of the invention can be replaced by Ag, Ni, Pd or Pt.

Example 7

Figure 28:
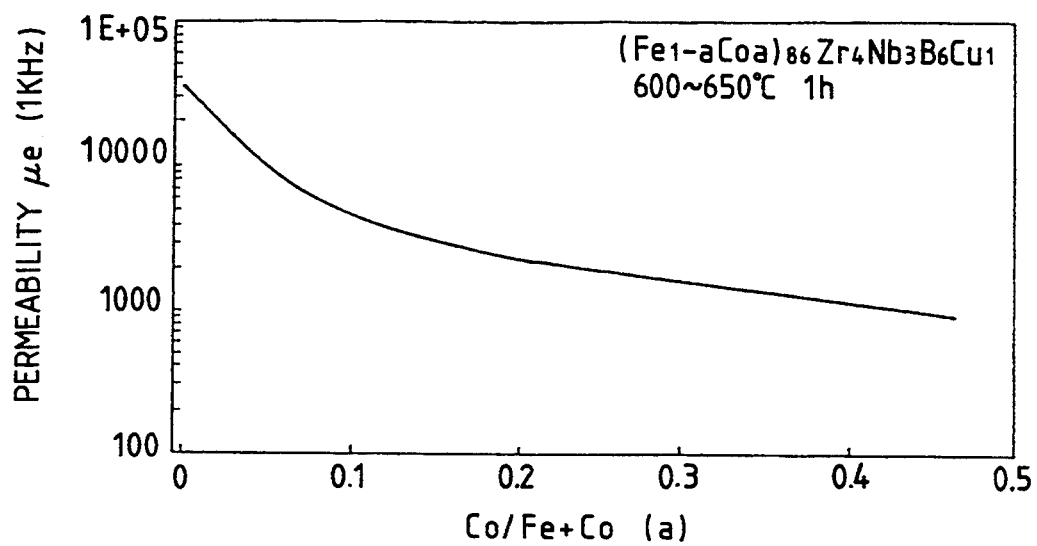
FIG. 28 is a graph showing the relationship between the varied amount of Co and permeability of an example of the alloy of the present invention.

Explanation will be made on the reason why the content of Co in the alloy of the present invention is limited within the specified range. FIG. 28 shows the relationship between the Co content (a) in $(Fe_{1-a}Co_a)_{86}Zr_4Nb_3B_6Cu_1$ alloys and their permeability.

It can be seen from FIG. 28 that while the effective permeability is as high as 10,000 or higher when a is within the range of 0.05, a exceeding 0.05 is practically undesirable because the effective permeability abruptly decreases.

Example 8

Explanation will be made on production of the alloy of the present invention by sputtering.

Thin film was prepared by a high frequency sputtering method in an Ar atmosphere. The thickness of the resulting film was 1 to 2 μm. After heat treating it at 500° to 700° C., the film was measured for its magnetic characteristics. Table 6 shows the results obtained.

TABLE 6

| Run No. | Composition of Alloy (at. %) | Permeability μe(1 K) | Coercive Force Hc(Oe) | Saturated Magnetic Flux Density Bs(kG) |
|---|---|---|---|---|
| 68 | $Fe_{86}Zr_7B_6Cu_1$ | 1,900 | 0.31 | 15.0 |
| 69 | $Fe_{86}Zr_4Nb_3B_6Cu_1$ | 2,050 | 0.30 | 15.2 |
| 70 | $Fe_{86}Hf_7B_6Cu_1$ | 2,020 | 0.28 | 14.7 |

From Table 6, it can be seen that all the alloy films exhibit excellent soft magnetic characteristics and that the alloy of the present invention can also be prepared by a sputtering method.

Examples 9 to 13

Production of Alloy of Formula (Ic) and (Id)

Alloys of Examples 9 to 13 hereinbelow were prepared by a single roll liquid quenching method. That is, a molten metal was ejected from a nozzle positioned above a single steel roll rotating in a predetermined direction under pressure applied by means of argon gas onto the surface of the cooling roll to quench it to obtain a ribbon. The ribbon thus produced was about 15 mm in width and about 20 to 40 μm.

Permeability was measured by an inductance method, which was carried out using a solenoid prepared by processing the ribbon into a ring having an outer diameter of 10 mm and an inner diameter of 6 mm, superimposing a plurality of such rings to form a laminate, around which was wound a coil. Measurement of effective permeability (μe) was conducted under the conditions of 10 mOe and 1 kHz. Saturated magnetic flux density (Bs) was calculated from magnetization measured using a VSM at 10 kOe. Unless otherwise indicated specifically, magnetic characteristics referred to in Examples 9 to 13 below were on the material quenched in water after retaining at a temperature of 600° C. or 650° C. for 1 hour.

Example 9

Effects of heat treatment on the magnetic characteristics and structure of the alloy of the present invention were examined taking an $Fe_{91}Zr_7B_2$ alloy as an example. The crystallization initiation temperature of the $Fe_{91}Zr_7B_2$ alloy measured by differential thermal analysis conducted at a temperature elevation rate of 10° C./min. was 480° C.

Figure 29:
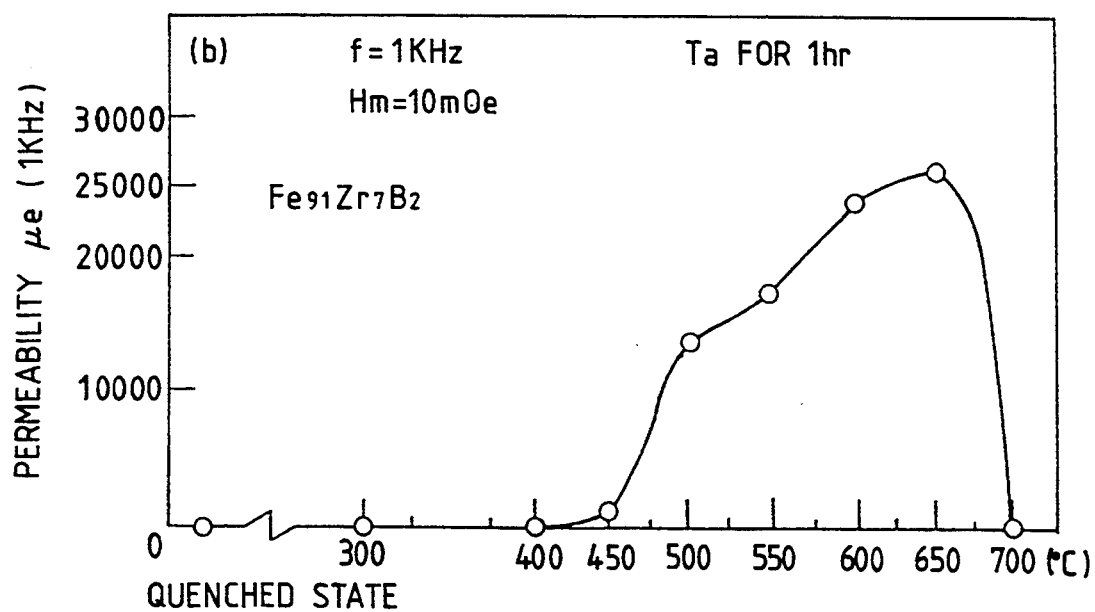
FIG. 29 is a graph showing the relationship between the effective permeability and annealing temperature of the alloy of the present invention.

FIG. 29 is a graph showing effects of annealing (quenching in water after retaining at a predetermined temperature for 1 hour) on the effective permeability of the $Fe_{91}Zr_7B_2$ alloy.

From FIG. 29, it can be seen that the effective permeability of the alloy of the invention in a quenched state (RQ) is at a low level, as low as that of an Fe-based amorphous alloy, but reaches a value by about 10 times as high as the value obtained in the quenched state by effecting annealing at 500° to 650° C. Here, upon examination of dependency of the permeability on frequency using a specimen having a thickness of about 20 μm subjected to heat treatment at 650° C., it was found that the permeability was 26,500 at 1 kHz, 19,800 at 10 kHz and 7,80 at 100 kHz, indicating that even at the high frequencies tested, excellent soft magnetic characteristics were obtained. Further, examination on the effect of cooling rate of the permeability revealed that the alloy of the invention had an effective permeability of 26,500 by quenching in water after being held at 650° C. for 1 hour, but after cooling in the air it had an effective permeability of 18,000, thus indicating that the cooling rate after heat treatment was important.

Next, changes in structure of the $Fe_{91}Zr_7B_2$ alloy by heat treatment were examined by X-ray diffraction method, and the texture of the alloy after the heat treatment was observed using a transmission electron microscope. Similar results to those shown in FIGS. 22 and 23 were obtained. Therefore, it revealed that the structure of the alloy of the invention is changed from amorphous state to body centered cubic crystal as a result of the heat treatment, and that the texture after the heat treatment is composed of fine crystal grains having a particle diameter of about 100 Å. Further, examination of changes in hardness of the $Fe_{91}Zr_7B_2$ alloy by heat treatment revealed that Vickers hardness of the alloy increased from 750 DPN in a quenched state to 1,400 DPN, which indicates that the alloy of the invention is suitable as a material for magnetic heads.

Next, examples are shown in which the amounts of Zr and of B in the above-described alloy were changed. Table 7 below and FIGS. 30 to 33 show magnetic characteristics after annealing.

TABLE 7

| Run No. | Composition of Alloy (at. %) | Heat Treatment °C. 1 Hr | Permeability μ 1 KHz | Saturated Magnetic Flux Density Bs(T) |
|---|---|---|---|---|
| 71 | $Fe_{91}Zr_8B_1$ | 600 | 12,384 | 1.67 |
| 72 | $Fe_{91}Zr_9$ | 600 | 1,056 | 1.65 |
| 73 | $Fe_{89}Zr_9B_4$ | 600 | 1,901 | 1.49 |
| 74 | $Fe_{87}Zr_9B_4$ | 600 | 167 | 1.15 |
| 75 | $Fe_{91}Zr_5B_4$ | 600 | 3,398 | 1.73 |
| 76 | $Fe_{89}Zr_5B_6$ | 600 | 24,384 | 1.70 |
| 77 | $Fe_{87}Zr_5B_8$ | 600 | 10,829 | 1.60 |
| 78 | $Fe_{87}Zr_3B_{10}$ | 600 | 296 | 1.72 |
| 79 | $Fe_{87}B_{13}$ | 600 | 192 | 1.80 |
| 80 | $Fe_{81}Zr_7B_{12}$ | 600 | 230 | 1.29 |
| 81 | $Fe_{85}Zr_{11}B_4$ | 600 | 2 | 0.9 |
| 82 | $Fe_{93}Zr_7$ | 600 | 4,550 | 1.73 |
| 83 | $Fe_{91}Zr_7B_2$ | 600 | 24,384 | 1.66 |
| 84 | $Fe_{89}Zr_7B_4$ | 600 | 20,554 | 1.60 |
| 85 | $Fe_{92}Zr_7B_1$ | 600 | 17,184 | 1.71 |
| 86 | $Fe_{90}Zr_7B_3$ | 600 | 23,808 | 1.66 |
| 87 | $Fe_{88}Zr_7B_5$ | 600 | 8,794 | 1.55 |
| 88 | $Fe_{85}Zr_7B_8$ | 600 | 1,344 | 1.42 |
| 89 | $Fe_{91}Zr_6B_3$ | 600 | 19,776 | 1.71 |
| 90 | $Fe_{90}Zr_6B_4$ | 600 | 22.464 | 1.70 |

TABLE 7-continued

| Run No. | Composition of Alloy (at. %) | Heat Treat-Ment °C. 1 Hr | Permeability μ 1 KHz | Saturated Magnetic Flux Density Bs(T) |
|---|---|---|---|---|
| 91 | Fe$_{90}$Zr$_8$B$_2$ | 600 | 10,944 | 1.59 |
| 92 | Fe$_{89}$Zr$_8$B$_3$ | 600 | 8,083 | 1.54 |
| 93 | Fe$_{92}$Zr$_6$B$_2$ | 600 | 2,362 | 1.71 |

Figure 30:
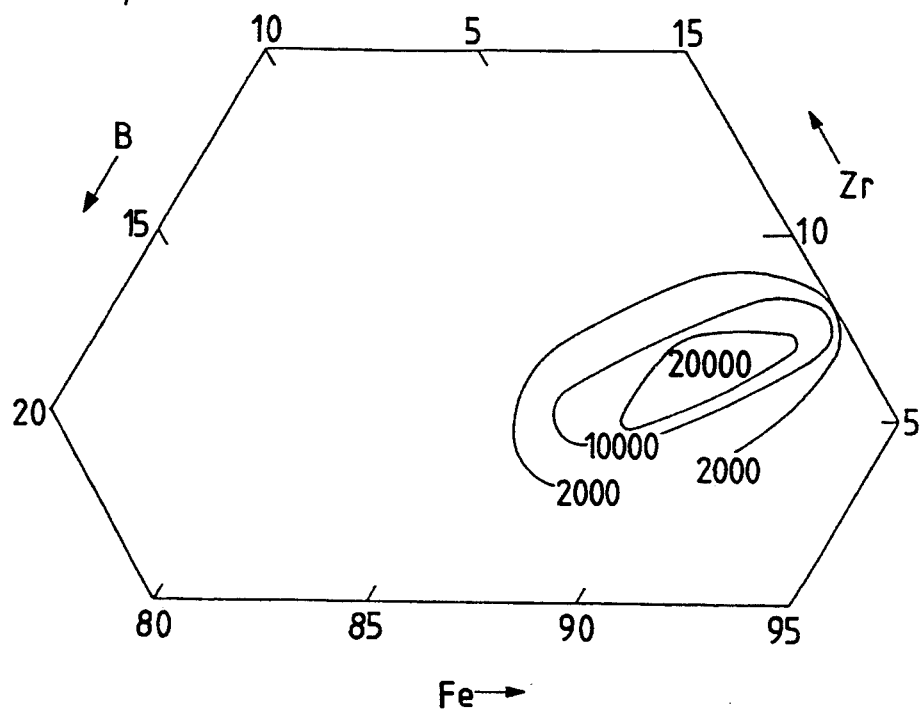
FIG. 30 is a triangular composition diagram of an example of the alloy of the present invention, illustrating variation of the magnetic characteristics after heat treatment at 600° C. with varied amounts of Zr, of B and of Fe.
Figure 31:
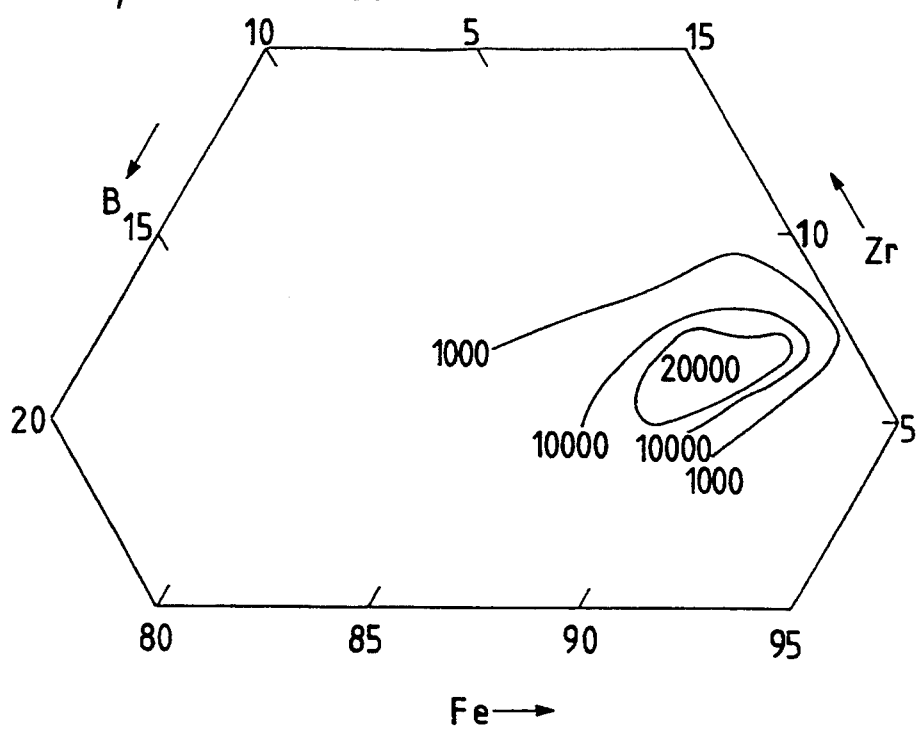
FIG. 31 is a triangular composition diagram of an example of the alloy of the present invention, illustrating variation of the magnetic characteristics after heat treatment at 650° C. with varied amounts of Zr, of B and of Fe.
Figure 32:
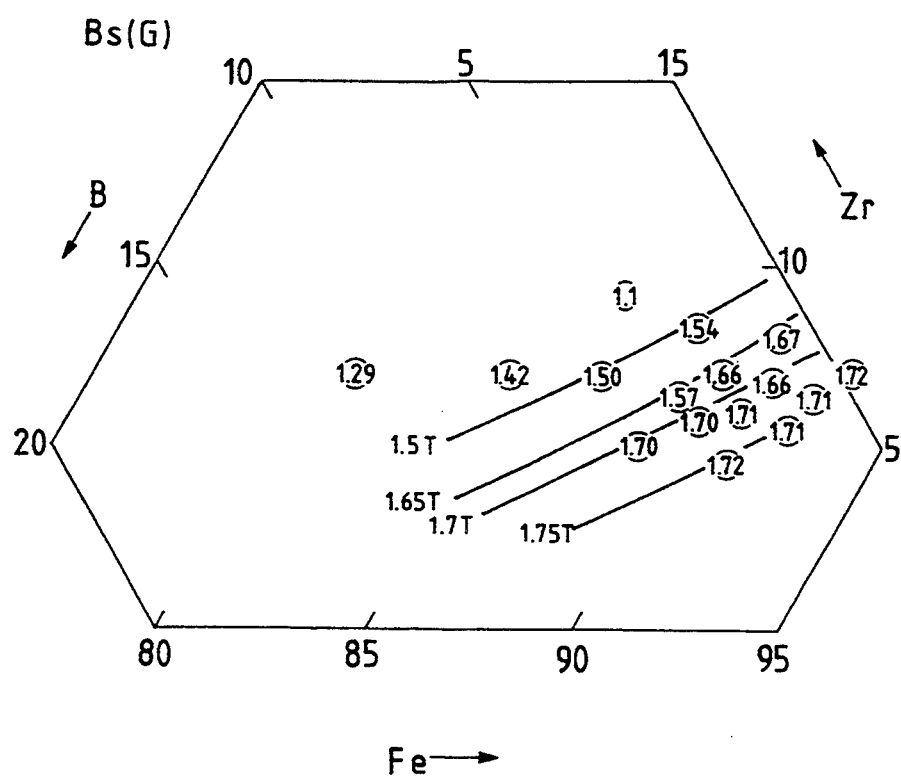
FIG. 32 is a triangular composition diagram of an example of the alloy of the present invention, illustrating variation of the magnetic flux density with varied amounts of Zr, of B and of Fe.
Figure 33:
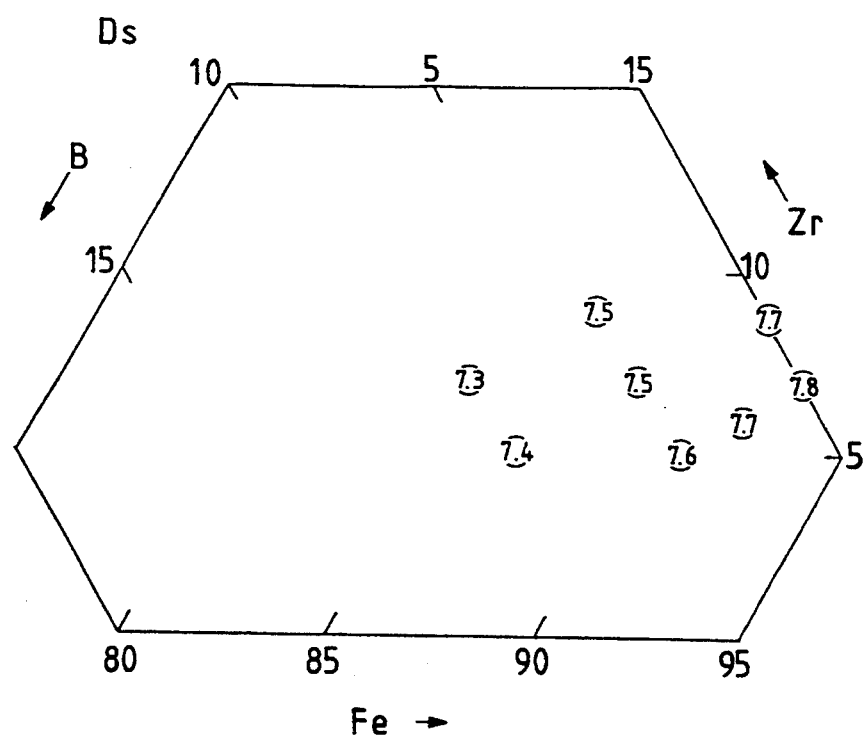
FIG. 33 is a triangular composition diagram of an example of the alloy of the present invention, illustrating Ds value.

FIGS. 30, 31 and 32 indicate that a high permeability can readily be obtained when the amount of Zr is within the range of 4 to 9 atomic % in the absence of the second additive element. With the amount of Zr being 4 atomic % or less, an effective permeability of 10,000 or higher is not obtained. The amount of Zr exceeding 9 atomic % is undesirable because not only the permeability decreases abruptly but also the saturated magnetic flux density also decreases.

Similarly, a high effective permeability as high as no lower than 10,000 can readily be obtained with the amount of B being within the range of 0.5 to 8 atomic %. Even when the amounts of Zr and of B are within the above range, no high permeability is obtained if the amount of Fe exceeds 93 atomic %.

Example 10

Next, Fe—Hf—B type alloys obtainable by replacing Zr in the alloy used in Example 9 by Hf are explained below.

Table 8 shows magnetic characteristics of various Fe—Hf—B type alloys in which the amount of Hf was varied within the range of 4 to 9 atomic %.

TABLE 8

| Run No. | Composition of Alloy (at. %) | Permeability μe(1 K) | Saturated Magnetic Flux Density Bs(kG) |
|---|---|---|---|
| 94 | Fe$_{88}$Hf$_4$B$_8$ | 8,200 | 16.2 |
| 95 | Fe$_{89}$Hf$_5$B$_6$ | 17,200 | 16.0 |
| 96 | Fe$_{90}$Hf$_6$B$_4$ | 24,800 | 15.5 |
| 97 | Fe$_{89}$Hf$_7$B$_4$ | 28,000 | 15.0 |
| 98 | Fe$_{88}$Hf$_8$B$_4$ | 25,400 | 14.5 |
| 99 | Fe$_{87}$Hf$_9$B$_4$ | 12,100 | 14.0 |
| 100 | Fe$_{91}$Zr$_4$Hf$_3$B$_4$ | 27,800 | 16.5 |

From Table 8, it can be seen that with the amount of Hf being within the range of 4 to 9 atomic %, the effective permeability of the Fe—Hf—B type alloys is equivalent to that of Fe—Zr—B type alloys. Further, the magnetic characteristics of the Fe$_{91}$Zr$_4$Hf$_3$B$_2$ alloy in Table 8 are equivalent to those of Fe—Zr—B type of alloys in Example 9. Therefore, Zr in the Fe—Zr—B type alloys in Example 9 can be replaced by Hf partly or entirely over the whole composition limitation range of 4 to 9 atomic %.

Example 11

Explanation will be made on replacement of a part of Zr and/or Hf in the Fe—(Zr,Hf)—B—Cu type alloys in Examples 1 and 2 by Nb.

Table 9 shows results of replacement of a part of Zr in the Fe—Zr—B—Cu type alloys by 1 to 5 atomic % of Nb.

TABLE 9

| Run No. | Composition of Alloy (at. %) | Permeability μe(1 K) | Saturated Magnetic Flux Density Bs(kG) |
|---|---|---|---|
| 101 | Fe$_{90}$Zr$_6$Nb$_1$B$_3$ | 21,000 | 16.6 |
| 102 | Fe$_{89}$Zr$_5$Nb$_2$B$_4$ | 14,000 | 16.2 |
| 103 | Fe$_{88}$Zr$_6$Nb$_2$B$_4$ | 12,500 | 15.4 |
| 104 | Fe$_{87}$Zr$_7$Nb$_2$B$_4$ | 7,600 | 14.5 |
| 105 | Fe$_{86}$Zr$_8$Nb$_2$B$_4$ | 2,300 | 14.0 |
| 106 | Fe$_{89}$Zr$_6$Nb$_3$B$_2$ | 8,200 | 15.9 |
| 107 | Fe$_{88}$Zr$_6$Nb$_4$B$_2$ | 4,100 | 14.5 |
| 108 | Fe$_{87}$Zr$_6$Nb$_5$B$_2$ | 1,800 | 14.0 |

From Table 9, it can be seen that the amount of Zr+Nb which gives a high permeability is within the range of 4 to 9 atomic % as in the case of the amount of Nb in the Fe—Zr—B type alloys. In this range, high effective permeabilities as high as the Fe—Zr—B type alloys are obtained. Therefore, a part of Zr and/or Hf in the Fe—(Zr, Hf)—B alloys can be replaced by Nb.

Example 12

Next, explanation will be made on replacement of Nb in the Fe—(Zr, Hf)—Nb—B type alloys by Ti, V, Ta, Mo or W. Table 10 shows magnetic characteristics of Fe—Zr—T—B (T=Ti, V, Ta, Mo, W) type alloys.

TABLE 10

| Run No. | Composition of Alloy (at. %) | Permeability μe(1 K) | Saturated Magnetic Flux Density Bs(kG) |
|---|---|---|---|
| 109 | Fe$_{89}$Zr$_6$Ti$_1$B$_3$ | 12,800 | 15.8 |
| 110 | Fe$_{89}$Zr$_6$V$_2$B$_3$ | 11,100 | 15.8 |
| 111 | Fe$_{89}$Zr$_6$Ta$_2$B$_3$ | 15,600 | 15.2 |
| 112 | Fe$_{89}$Zr$_6$Mo$_2$B$_3$ | 12,800 | 15.3 |
| 112 | Fe$_{89}$Zr$_6$W$_2$B$_3$ | 13,100 | 15.1 |

Each run in Table 10 exhibited magnetic characteristics superior to effective permeability of 5,000 usually obtained in Fe-based amorphous alloys. Therefore, Nb in the Fe—(Zr,Hf)—Mb—B type alloys can be replaced by Ti, V, Ta, Mo or W.

Example 13

Figure 34:
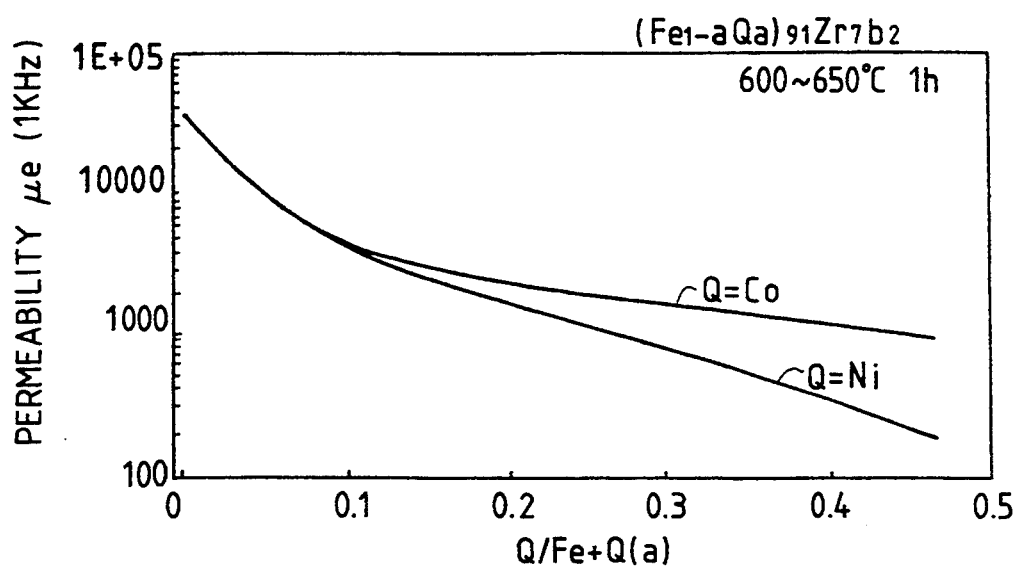
FIG. 34 is a graph showing the relationship between the amount of Co and permeability of an example of the alloy of the present invention.

Next, explanation will be made on the reason why the contents of Co and Ni in the alloy of the present invention are limited within the specified ranges. FIG. 34 shows the relationship between the Co+Ni content (a) in (Fe$_{1-a}$Q$_a$)$_{91}$Zr$_7$B$_2$ alloys and their permeability It can be seen from FIG. 34 that while the effective permeability is as high as 10,000 or higher is when a is within the range of 0.05 or less, a exceeding 0.05 is practically undesirable because in this range the effective permeability decreases abruptly.

Example 14

Figure 35:
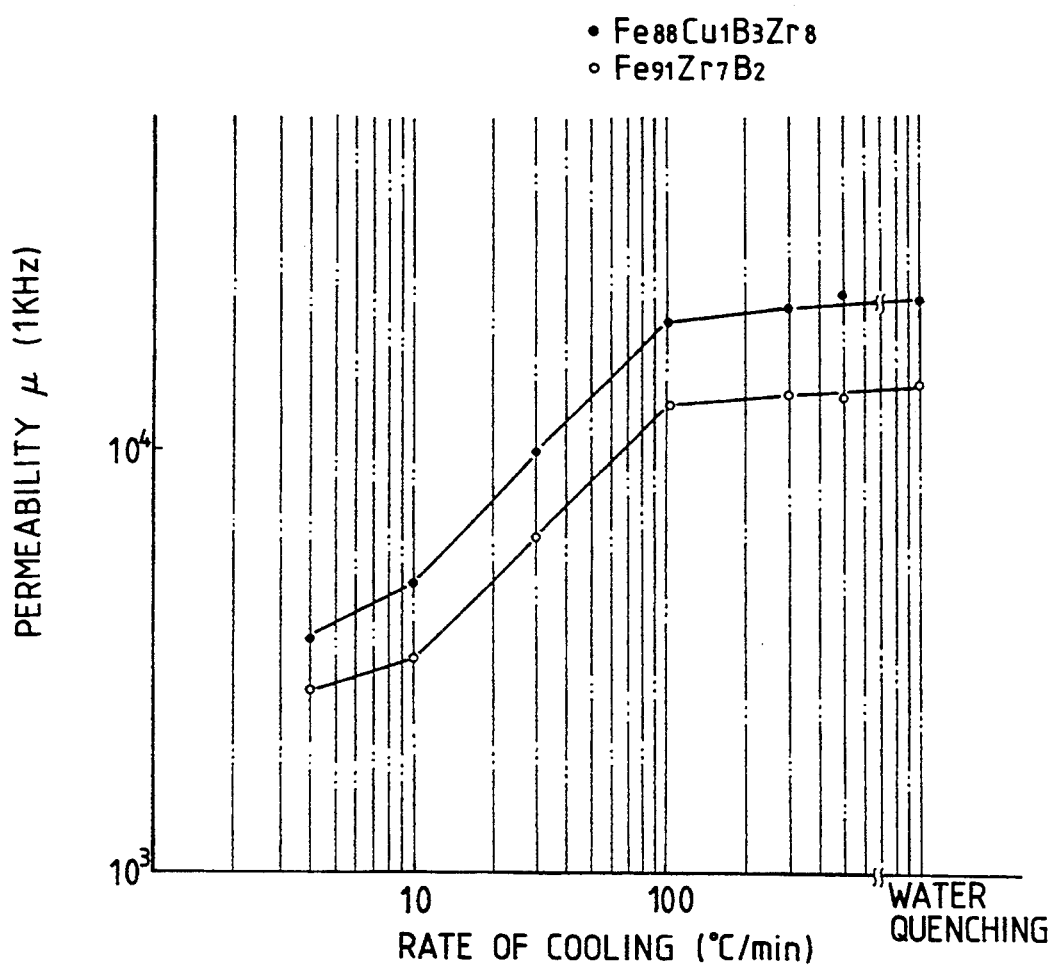
FIG. 35 is a graph showing the relationship between rate of heat treatment and permeability of an example of the alloy of the present invention.

A soft magnetic alloy sample having a composition of Fe$_{88}$Cu$_1$B$_3$Zr$_8$ and the one having a composition of Fe$_{91}$Zr$_7$B$_2$ were measured on their permeability after heating at 650° C. for 1 hour and then cooling at various cooling rates. FIG. 35 shows the results obtained.

As will be apparent from the results shown in FIG. 35, cooling rates of 100° C./minute or higher, good permeability is obtained but at 100° C./minute or lower, permeability decreases greatly.

Example 15

Taking an alloy having a composition of $Fe_{86}Zr_7B_6Cu_1$ as an example from among the alloys of the invention, a soft magnetic thin film was prepared and its magnetic characteristics and effects of heat treatments were examined.

First, a soft magnetic thin film having a composition of $Fe_{86}Zr_7B_6Cu_1$ was prepared using an RF double focus sputtering apparatus. Sputtering was performed in Ar gas atmosphere or $Ar+N_2$ gas atmosphere using a complex target which included an Fe target and respective pellets of Zr, B and Cu properly arranged on the Fe target to form a soft magnetic thin film having a thickness of 2 μm.

The soft magnetic thin film thus obtained was measured on its saturated magnetic flux density (Bs), initial permeability (μ, 10 mOe, 1 MHz) and coercive force (Hc) after annealing.

The measurement of permeability and coercive force was carried out in a direction of axis of easy magnetization. The crystallization initiation temperature of the $Fe_{86}Zr_7B_6Cu_1$ alloy measured by differential thermal analysis conducted at a temperature elevation rate of 10° C./min. was 503° C.

Examination of the effects of heat treatment (600° C.) on the magnetic characteristics of the soft magnetic thin film revealed that the alloy before the heat treatment had a saturated magnetic flux density (Bs) of 7 kG, a permeability (μ) of 150, and a coercive force (Hc) of 80 Oe and after the heat treatment it had a saturated magnetic flux density (Bs) of 15 kG, a permeability (μ) of 1900, and a coercive force (Hc) of 0.31 Oe. Thus, the magnetic characteristics of the alloy were remarkably improved by the heat treatment.

Similar effects were obtained by heat treatment at 500° to 620° C.

Further, examination of the effect of cooling rate on the permeability revealed that the alloy of the invention had an effective permeability of 19,000 by quenching in water after being held at 600° C. for 1 hour, but after cooling in the air it had an effective permeability of 1,050, thus indicating that the cooling rate after heat treatment was important and that it is preferable to quench at a cooling rate of 100° C./minute or higher.

Next, changes in structure of the soft magnetic thin film by heat treatment were examined by X-ray diffraction method, and the texture of the alloy after the heat treatment was observed using a transmission electron microscope. Similar results as shown in FIGS. 22 and 23, respectively, were obtained. Therefore, it revealed that the structure of the alloy of the invention changed from amorphous structure to body centered cubic crystals, and that the texture after the heat treatment is composed of fine crystal grains having a particle diameter of about 100 Å.

Example 16

A magnetic head core was prepared by the process earlier described with respect to the production of the powder compact referring to FIGS. 8 to 11, and the magnetic performance of the magnetic head core obtained was measured.

As for the Fe-based soft magnetic alloy powder, a powder was used which was obtained by heating an alloy having a composition of $F_{90}Zr_7B_2Cu_1$ at the crystallization temperature or higher and pulverizing it.

The soft magnetic alloy powder was molded by a press into a compact having a shape of a magnetic head core. Then, the molded article was pre-sintered at a temperature of 500° to 600° C. in an inert gas atmosphere including vacuum. Subsequently, the molded article was subjected to hot hydraulic pressing under the conditions of a temperature of 600° C., a pressure of 5,000 atm, and a sintering time of 1 hour.

It was confirmed that the magnetic head core thus obtained had a permeability μe (1 kHz) of 18,000, a coercive force of 0.03 Oe, and a saturated magnetic flux density of 16.7 kG, and exhibited excellent magnetic characteristics.

Example 17

Explanation will be made of the effectiveness of the apparatus for continuously producing a ribbon according to the present invention explained referring to FIG. 2 based on experimental results shown in FIG. 36.

Figure 36:
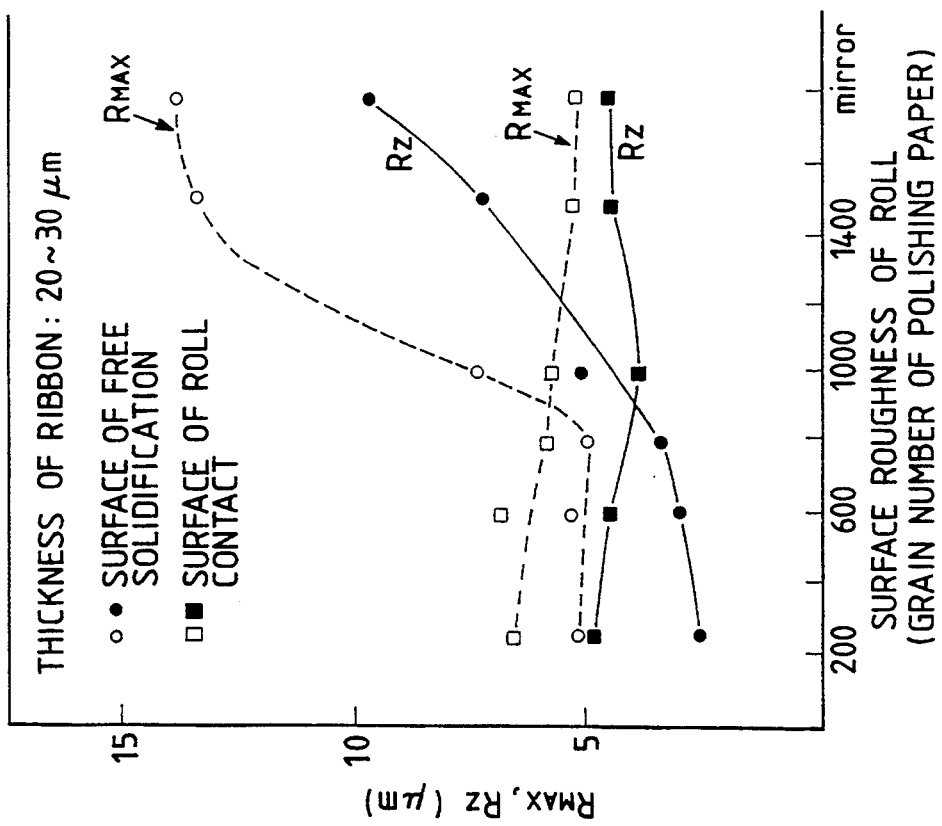
FIG. 36 is a graph showing the relationship between the surface roughness of the cooling roll in the apparatus used in Example 17 and the surface roughness of the ribbon produced by the apparatus.

FIG. 36 is a graph showing the relationship between the surface roughness of the cooling roll 10 and the respective surface roughness of the ribbon 50 on each side. In FIG. 36, horizontal axis indicates the grain number of polishing paper used in polishing the cooling roll, and vertical axis indicates maximum surface roughness, Rmax, measured using a needle type surface roughness meter, and 10-point average surface roughness, Rz, prescribed by JIS-B-0601. In this experiment, a molten metal of an Fe-based soft magnetic alloy having a composition of $Fe_{91}Zr_7B_2$ was used.

From FIG. 36, a tendency is observed that the surface roughness of the freely solidifying surface was better as the surface roughness of the cooling roll increased (the smaller the grain number of polishing paper) but is aggravated the as the surface roughness of the cooling row becames closer to a mirror surface (the larger the grain number of polishing paper).

On the other hand, the surface roughness of the cooling roll-contacting surface of the ribbon does not vary as much but roughly speaking, there was observed a tendency that the smaller the surface roughness of the cooling roll (the larger the grain number of polishing paper) the better the surface roughness of the cooling roll-contact surface of the ribbon.

When the surface of the cooling roll was polished with a polishing paper with a grain number 800, the surface roughness values on the both sides of the ribbon were substantially equal to each other, and in that case, the surface roughness of the ribbon is substantially the same as that of the cooling roll-contacting surface when the surface of the cooling roll was mirror surface-finished (conventional case). When polishing papers with a grain number 600 to 1,000 were used, substantially the same results as above were obtained. However, outside this range, the surface roughness of the freely solidifying surface becomes too large to limit fluctuations in surface roughness within acceptable ranges.

By annealing the ribbon produced as described above by heating it to 650° C. for 1 hour and then gradual cooling, an Fe-based soft magnetic alloy ribbon was obtained.

It has revealed that the Fe-based soft magnetic alloy ribbon thus obtained had a saturated magnetic flux density of 1.7 kG and a permeability at 1 kHz of 14,000, and was excellent in soft magnetic characteristics. The Fe-based soft magnetic alloy ribbon showed a Vickers hardness of 1,300 DPN, which indicated that the ribbon had a sufficient hardness to be useful for magnetic heads.

Example 18

Using the apparatus for continuously producing a ribbon earlier described referring to FIGS. 3 and 4, a ribbon of $Fe_{91}Hf_7B_2$ was produced. On this occasion, the size $l_1$ in FIG. 4 was set to a value within the range of 0.3 to 0.5 mm, and the angle $\theta$ of slanting of the nozzle 20 was set to $\theta=40°$. The $Fe_{91}Hf_7B_2$ ribbon thus obtained was annealed by to heating to 550° C. for 1 hour and then gradually cooled. As a result, an Fe-based soft magnetic alloy ribbon was obtained.

It was revealed that the Be-based soft magnetic alloy ribbon thus obtained had a saturated magnetic flux density of 1.6 kG, and a permeability at 1 kHz of 18,000 and was excellent in soft magnetic characteristics and also had a Vickers hardness of 1,300 DPN, which indicated that the ribbon has a sufficient hardness to be useful for magnetic heads. Thus, a ribbon having surface roughness values sufficiently small on the both sides and having excellent soft magnetic characteristics was obtained.

Example 19

After evacuating the inside of the chamber so constructed as shown in FIG. 7 to a pressure of about $10^{-5}$ Torr, Ar gas was introduced into the chamber to establish an Ar gas pressure of 0.5 kg/cm$^2$. Molten Fe-based soft magnetic alloy having a composition of $Fe_{91}Zr_7B_2$ was supplied to the apparatus to produce a soft magnetic alloy ribbon. The ribbon was taken out from the chamber and heated to 650° C. for 1 hour, followed by gradually cooling to thereby anneal it. As a result, an Fe-based soft magnetic alloy ribbon was obtained.

It has revealed that the Be-based soft magnetic alloy ribbon thus obtained had a saturated magnetic flux density of 1.7 kG, and a permeability at 1 kHz of 14,000 and was excellent in soft magnetic characteristics and also had a Vickers hardness of 1,300 DPN, which indicated that the ribbon has a sufficient hardness to be useful for magnetic heads. Thus, a ribbon having surface roughness values sufficiently small on the both sides and having excellent soft magnetic characteristics was obtained.

Example 20

An annular magnetic core was prepared by the process earlier described with respect to the production of the powder compact referring to FIGS. 8 to 11, and the magnetic performance of the magnetic core obtained was measured.

As for the Fe-based soft magnetic alloy powder, a powder was used which was obtained by heating an alloy having a composition of $Fe_{89}Zr_8B_2Cu_1$ at the crystallization temperature or higher and pulverizing it.

The soft magnetic alloy powder was molded by a press into an annular compact. Then, the molded article was pre-sintered at a temperature of 500° to 600° C. in an inert gas atmosphere including vacuum. Subsequently, the molded article was subjected to hot hydraulic pressing under the conditions of a temperature of 600° C., a pressure of 5,000 atm, and a sintering time of 24 hours.

It was confirmed that the magnetic core thus obtained had a permeability $\mu_e$ (1 kHz) of 8,000, a coercive force of 0.2 Oe, and a saturated magnetic flux density of 16 kG, and thus exhibited excellent magnetic characteristics.

A plurality of magnetic cores produced in the same manner as above were measured on iron loss $W_2/_{100K}$ up to a peak value Bm of a magnetic flux density being 2 kG and a frequency f being 100 kHz using a U function meter. Table 11 shows the results obtained. The composition of the soft magnetic alloy constituting each magnetic core is as shown in Table 11.

TABLE 11

| Run No. | Composition of Alloy (at. %) | Iron Loss (mW/cm$^3$) |
|---|---|---|
| 114 | $Fe_{87}Zr_7B_5Cu_1$ | 430 |
| 115 | $Fe_{90}Zr_7B_3$ | 550 |
| 116 | $Fe_{87}Hf_7B_5Cu_1$ | 450 |
| 117 | $Fe_{87}Zr_4Hf_3B_5Cu_1$ | 400 |
| 118 | $Fe_{86}Zr_4Nb_3B_6Cu_1$ | 420 |
| 119 | $Fe_{86}Zr_4Nb_3B_6Pt_1$ | 700 |
| 120 | $Fe_{78}Si_{10}B_{12}$ | 1,100 |
| 121 | $Fe_{73}Nb_3Si_{14}B_{10}$ | 470 |
| 122 | Mn—Zn Ferrite | 400 |

As will be apparent from Table 11, the magnetic core made of the alloy having the specified composition used in the present invention had a less iron loss.

From the above, it has been revealed that the magnetic core of the present invention is suitable for high frequency coils, saturable reactors and the like.

Example 21

On a soft magnetic thin ribbon composed of $F_{90}Zr_7B_2Cu_1$ and having a thickness of 20 μm and a width of 50 mm was covered with an insulating layer composed of MgO and a thickness of 1 μm to prepare a ribbon. The ribbon was wound to make a magnetic core in the form of a ring of 200 mm in height and 100 mm in width. The magnetic core was heated at 600° C. for 1 hour in a N$_2$ gas atmosphere, and then cooled to room temperature at a cooling rate of 100° C./minute.

Two of the thus-heat treated magnetic cores were placed side by side and a wire was wound around them as shown in FIG. 14 to make a transformer of a structure as shown in FIG. 14. The transformer had a saturated magnetic flux density of 16.7 kG, a squareness ratio Br/Bs of 80%, a coercive force of 30 mOe, a saturated magnetic strain constant of $5 \times 10^{-6}$ which is lower than the value $5 \times 10^{-5}$ given by the conventional Fe-based amorphous alloy for distribution transformers. The instant transformer had an iron loss of 0.10 W/kg at 50 Hz and Bm being 12 kG. Therefore, it was confirmed that the transformer of the present invention exhibited excellent performance.

Example 22

A molten metal having a composition shown in Table 12 was quenched by a single roll method to prepare an alloy ribbon having a width of 25 mm and a thickness of 18 μm.

Then, the alloy ribbon was wound around to form a torocoidal core having an outer diameter of 40 mm and an inner diameter of 35 mm. The torocoidal core was subjected to the same heat treatment as in Example 21. The alloy after the heat treatment had a texture which was mostly composed of ultrafine crystal grains having a particle size of 100 to 200 Å or smaller. The core was placed in a core case and wiring with 250 turns was formed on both primary circuit side and secondary circuit side, and the iron loss of the resulting transformer was measured at 50 Hz and 12 kG. Results obtained are shown in Table 12.

TABLE 12

| Run No. | Composition of Alloy (at. %) | Iron Loss (mW/cm³) | Bs (kG) |
|---|---|---|---|
| 123 | $Fe_{90}Zr_7B_2Cu_1$ | 0.10 | 16.7 |
| 124 | $Fe_{89}Zr_7B_3Cu_1$ | 0.10 | 16.2 |
| 125 | $Fe_{86}Hf_7B_6Cu_1$ | 0.10 | 14.7 |
| 126 | $Fe_{86}Zr_7Hf_3B_6Cu_1$ | 0.11 | 14.8 |
| 127 | $Fe_{84}Zr_4Nb_3B_8Cu_1$ | 0.18 | 14.6 |
| 128 | $Fe_{86}Zr_4Ti_3B_6Cu_1$ | 0.17 | 14.7 |
| 129 | $Fe_{86}Zr_4Mo_3B_6Cu_1$ | 0.18 | 15.3 |
| 130 | $Fe_{86}Zr_4Nb_3B_6Cu_1$ | 0.16 | 15.2 |
| 131 | $Fe_{91}Zr_7B_2$ | 0.15 | 17.0 |
| 132 | $Fe_{91}Hf_7B_2$ | 0.11 | 16.0 |
| 133 | $Fe_{90}Zr_5Nb_2B_3$ | 0.20 | 16.4 |
| 134 | $Fe_{90}Zr_6Ti_1B_3$ | 0.21 | 16.5 |
| 135 | $Fe_{90}Zr_6V_1B_3$ | 0.20 | 16.5 |
| 136 | $Fe_{90}Zr_6W_1B_3$ | 0.22 | 16.5 |
| 137 | $Fe_{78}Si_9B_{13}$ (amorphous) | 0.12 | 15.6 |
| 138 | Silicon steel | 0.5 | 20.0 |

As will be apparent from Table 12, the transformer of the present invention has an iron loss smaller than the conventional silicone steel transformer and thus is suitable for pole transformers, low frequency inverter transformers, and the like.

Example 23

Figure 17B:
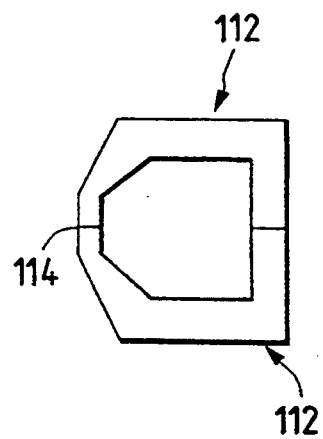
FIG. 17B is a perspective view of a pair of the laminate type cores shown in FIG. 17A in an assembled state.

A ribbon prepared from one of the alloys of the present invention having a composition of $Fe_{87}Zr_3Nb_3B_8Cu_1$ was processed according to the process of production of a laminate type core earlier described referring to FIG. 17 to produce a laminate type core 112, and using the core 112 a magnetic head 110 was produced.

Two laminate type cores 112 and 112 each having a coil 115 wound therearound were arranged in holding cases 111 and 111 such that butting surfaces formed a magnetic gap 115 therebetween. A gap plate 116 was inserted in the magnetic gap 114.

The magnetic head material thus obtained was measured on its magnetic characteristics. The magnetic head material had a permeability (1 kHz) of 33,800, a coercive force of 0.05 Oe and a saturated magnetic flux density of 16 kG. Thus it was confirmed that the magnetic head material had excellent magnetic characteristics, which were excellent enough as electro-magnetic converting characteristics for magnetic heads.

Figure 37:
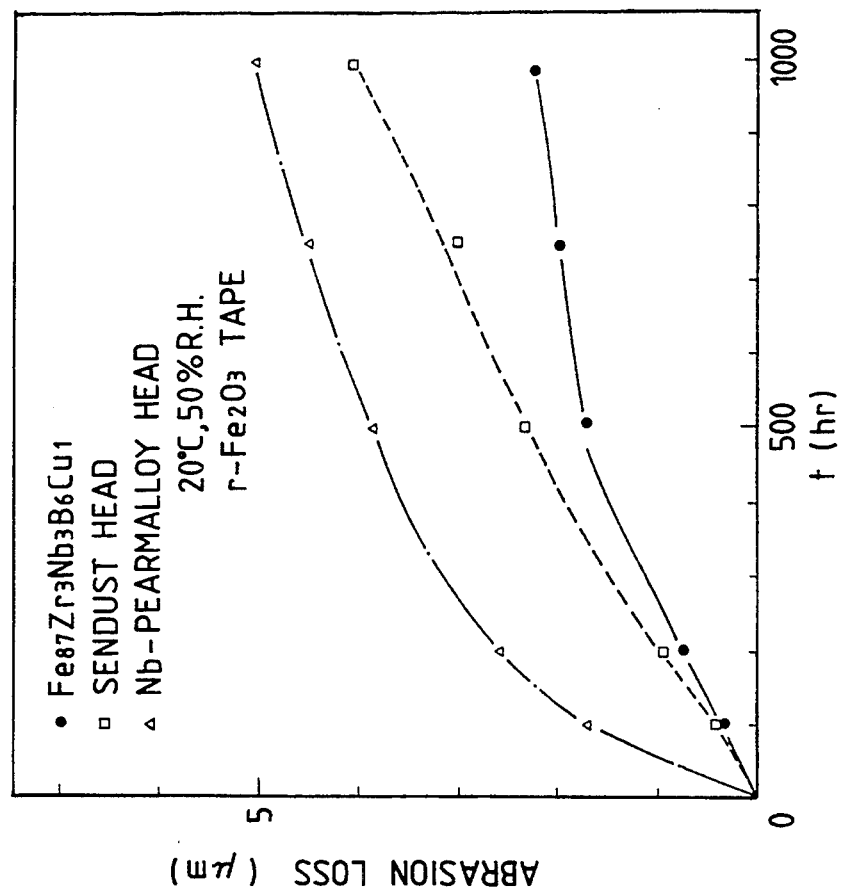
FIG. 37 is a graph showing abrasion resistance of the magnetic head obtained in Example 23.

Further, upon measurement of hardness, the magnetic head core showed a Vickers hardness of 1,300 DPN and thus found to be very hard. Therefore, it was successful to obtain a magnetic head having an excellent abrasion resistance as shown in FIG. 37.

Example 24

A magnetic head core D as shown in FIG. 18 was produced by the process earlier described with respect to the production of the powder compact referring to FIGS. 8 to 11, and the magnetic performance of a magnetic head having the magnetic head core D obtained was measured.

As for the Fe-based soft magnetic alloy powder, a powder was used which was obtained by heating an alloy having a composition of $Fe_{88}Zr_8B_3Cu_1$ at the crystallization temperature or higher and pulverizing it.

The soft magnetic alloy powder was molded by a press into a compact having a shape of a magnetic head core. Then, the molded article was pre-sintered at a temperature of 500° to 600° C. in an inert gas atmosphere including vacuum. Subsequently, the molded article was subjected to hot hydraulic pressing under the conditions of a temperature of 700° C., a pressure of 5,000 atm, and a sintering time of 24 hour.

The magnetic head core thus obtained had a permeability $\mu e$ (1 kHz) of 8,000, a coercive force of 0.20 Oe, and a saturated magnetic flux density of 16.5 kG, and thus it was confirmed that the magnetic head core exhibited excellent magnetic characteristics.

Example 25

Figure 38:
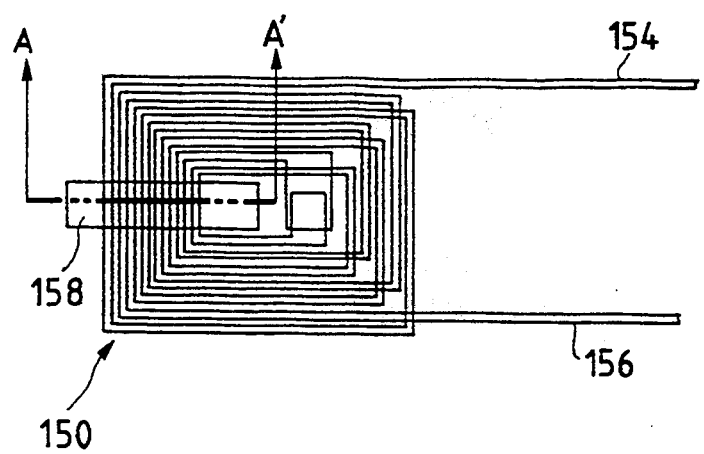
FIG. 38 is a plan view of the thin film type magnetic head of a two-layer spiral coil structure obtained in Example 25.
Figure 39:
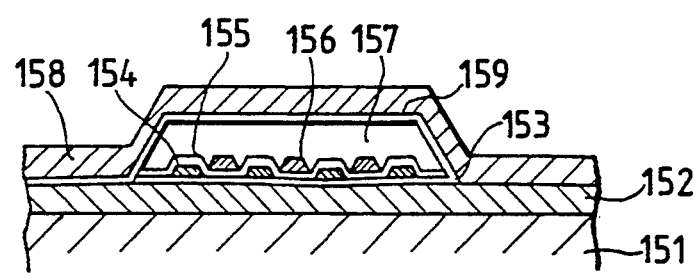
FIG. 39 is a cross-sectional view of the thin film type magnetic head shown in FIG. 38 taken along the line A-A'.

A thin film magnetic head 150 as shown in FIG. 38 and 39 was produced using the soft magnetic thin film of the present invention, and the magnetic characteristics of the magnetic head 150 were measured.

As for the Fe-based soft magnetic alloy powder, an alloy having a composition of $Fe_{86}Zr_7B_6Cu_1$ was used.

The thin film magnetic head 150 was produced as follows: first, on a non-magnetic substrate 151 was formed a lower magnetic layer 152 composed of the soft magnetic thin film of the invention, and then a first insulating layer 153 composed of $SiO_2$ or the like was formed on the layer 152 by sputtering or vapor deposition.

Next, a first coil conductor 154 composed of Cu or the like was formed on the layer 153, and thereon was formed a second insulating layer 155 composed of $SiO_2$ or the like.

Further, a second coil conductor 156 was formed between the portions of the first coil conductor 154.

On the first and second coil conductors was formed a third insulating layer 157 composed of $SiO_2$ or the like, followed by taper etching to form a window in order to magnetically connect an upper pole 158 to the lower pole 152. Thereafter, a gap layer 159 made of $SiO_2$ or the like was formed, and then only a part of the gap layer 159 that was located in a rear gap portion was etched.

On the etched portion was formed the upper magnetic layer 158 was formed.

Thus, the thin film magnetic head 150 of a 2-layer spiral structure was produced.

The thin film magnetic head 150 thus obtained had a permeability ($\mu$) (1 MHz) of 1,900, a coercive force of 0.31 Oe, a saturated magnetic flux density of 15 kG, and thus it was confirmed that the thin film magnetic head having excellent magnetic characteristics can be obtained.

The invention may be embodied in other specific forms without departing from the spirit or essential characteristics thereof. The embodiments hereinabove are therefore to be considered in all respects as illustrative and not restrictive, the scope of the invention being indicated by appended claims rather than by the foregoing description and all changes which come within the meaning and range of equivalency of the claims are therefore intended to be embraced therein.

What is claimed is:

1. An Fe-based soft magnetic alloy ribbon consisting of a composition represented by the formula (Ic):

$$(Fe_{1-a}Q_a)_b B_x T_y \qquad (Ic)$$

wherein Q represents at least one element selected from the group consisting of Co and Ni; T represents at least one element selected from the group consisting of Ti, Zr, Hf, V, Nb, Ta, Mo and W, with T always including one of (i) Zr, (ii) Hf, or (iii) Zr and Hf; a, b, x and y are real numbers satisfying the relationships:

$0 \leq a \leq 0.05$ atomic %, $75 \leq b \leq 93$ atomic %,
$0.5 \leq x \leq 8$ atomic %,
$4 \leq y \leq 10$ atomic %.

2. An Fe-based soft magnetic alloy ribbon composed of a composition represented by the formula (Id):

$$Fe_bB_xT_y \qquad (Id)$$

wherein T represents at least one element selected from the group consisting of Ti, Zr, Hf, V, Nb, Ta, Mo and W, with T always including one of (i) Zr, (ii) Hf, or (iii) Zr and Hf; b, x and y are real numbers satisfying the relationships:
$75 \leq b \leq 93$ atomic %,
$0.5 \leq x \leq 8$ atomic %, and
$4 \leq y \leq 9$ atomic %.

3. An Fe-based soft magnetic alloy core composed of compressed Fe-based soft magnetic alloy, said Fe-based soft magnetic alloy consisting of a composition represented by formula (Ic):

$$(Fe_{1-a}Q_a)_bB_xT_y \qquad (Ic)$$

wherein Q represents at least one element selected from the group consisting of Co and Ni; T represents at least one element selected from the group consisting of Ti, Zr, Hf, V, Nb, Ta, Mo and W, with T always including one of (i) Zr, (ii) Hf, or (iii) Zr and Hf; a, b, x and y are real numbers satisfying the relationships:
$0 \leq a \leq 0.05$ atomic %,
$75 \leq b \leq 93$ atomic %,
$0.5 \leq x \leq 8$ atomic %,
$4 \leq y \leq 10$ atomic %.

4. An Fe-based soft magnetic alloy core composed of compressed Fe-based soft magnetic alloy said Fe-based soft magnetic alloy consisting of a composition represented by the formula (Id):

$$Fe_bB_xT_y \qquad (Id)$$

wherein T represents at least one element selected from the group consisting of Ti, Zr, HF, V, Nb, Ta, Mo and W, with T always including one of (i) Zr, (ii) Hf, or (iii) Zr and Hf; b, x and y are real numbers satisfying the relationships:
$75 \leq b \leq 93$ atomic %,
$0.5 \leq x \leq 8$ atomic %,
$4 \leq y \leq 9$ atomic %.

* * * * *

UNITED STATES PATENT AND TRADEMARK OFFICE
CERTIFICATE OF CORRECTION

PATENT NO.    : 5,449,419
DATED         : September 12, 1995
INVENTOR(S)   : Kiyonori Suzuki, Akihiro Makino, Tsuyoshi Masumoto,
                Akihisa Onoue and Noriyuki Kataoka It is certified that error appears in the above-identified patent and that said Letters Patent is hereby corrected as shown below:

In the Abstract, line 22, after "powder" insert -- compacts,--

Column 40, line 17, delete "HF" and insert --Hf--.

Signed and Sealed this

Second Day of January, 1996

Attest:

BRUCE LEHMAN

*Attesting Officer*      *Commissioner of Patents and Trademarks*